US012562847B2

(12) United States Patent
Sarkis et al.

(10) Patent No.: US 12,562,847 B2
(45) Date of Patent: Feb. 24, 2026

(54) REDUNDANCY VERSION SELECTION IN SIDELINK

(71) Applicant: QUALCOMM Incorporated, San Diego, CA (US)

(72) Inventors: Gabi Sarkis, San Diego, CA (US); Kapil Gulati, Belle Mead, NJ (US); Tien Viet Nguyen, Bridgewater, NJ (US); Shuanshuan Wu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 189 days.

(21) Appl. No.: 17/729,111

(22) Filed: Apr. 26, 2022

(65) Prior Publication Data

US 2023/0344560 A1 Oct. 26, 2023

(51) Int. Cl.

| | |
|---|---|
| *H04L 1/18* | (2023.01) |
| *H04L 1/1812* | (2023.01) |
| *H04L 5/00* | (2006.01) |
| *H04W 28/02* | (2009.01) |
| *H04W 28/16* | (2009.01) |
| *H04W 72/56* | (2023.01) |

(52) U.S. Cl.
CPC .......... *H04L 1/1819* (2013.01); *H04L 5/0055* (2013.01); *H04W 28/0284* (2013.01); *H04W 28/16* (2013.01); *H04W 72/56* (2023.01)

(58) Field of Classification Search
None
See application file for complete search history.

(56) References Cited

U.S. PATENT DOCUMENTS

| | | | | |
|---|---|---|---|---|
| 10,432,362 B2 * | 10/2019 | Iyer | ........................ | H04L 1/1614 |
| 11,646,822 B2 * | 5/2023 | Zhang | .................... | H04L 1/0073 |
| | | | | 370/329 |
| 11,742,988 B2 * | 8/2023 | Lee | ..................... | H04W 72/543 |
| | | | | 370/329 |
| 2017/0332359 A1 * | 11/2017 | Tsai | ...................... | H04W 68/02 |

(Continued)

FOREIGN PATENT DOCUMENTS

| | | |
|---|---|---|
| WO | WO-2020033719 A1 | 2/2020 |
| WO | WO-2020092939 A1 | 5/2020 |

(Continued)

OTHER PUBLICATIONS

International Search Report and Written Opinion—PCT/US2023/065841—ISA/EPO—Jun. 13, 2022.

*Primary Examiner* — Mujtaba M Chaudry
(74) *Attorney, Agent, or Firm* — Holland & Hart LLP

(57) ABSTRACT

Methods, systems, and devices for wireless communications are described. A user equipment (UE) may receive information indicative of one or more sets of redundancy version available for sidelink communications. Each set of redundancy versions may be associated with one or more conditions for use of a respective set. The UE may determine that one or more conditions for a first set of the one or more sets of redundancy versions are satisfied. The UE may select the first set for transmission of a sidelink message based on the satisfaction of the one or more conditions associated with the first set. The UE may transmit the sidelink message to a second UE using a redundancy version included within the first set of redundancy versions.

20 Claims, 11 Drawing Sheets

(56)     References Cited

U.S. PATENT DOCUMENTS

| | | | | |
|---|---|---|---|---|
| 2019/0260547 A1* | 8/2019 | Nammi | ................ | H04L 5/0058 |
| 2019/0394769 A1* | 12/2019 | Gilda | ................... | H04L 1/1825 |
| 2020/0186290 A1* | 6/2020 | Zhang | .................. | H04L 1/0073 |
| 2021/0136810 A1* | 5/2021 | Kung | ................... | H04B 7/0626 |
| 2021/0144570 A1* | 5/2021 | Chae | ................... | H04L 5/0094 |
| 2021/0176776 A1* | 6/2021 | Choi | ......................... | H04L 1/08 |
| 2021/0400655 A1* | 12/2021 | Fong | ................... | H04L 1/1812 |
| 2022/0052820 A1* | 2/2022 | Ling | ........................ | H04L 1/18 |
| 2022/0104265 A1* | 3/2022 | Bang | ................. | H04L 27/2646 |
| 2022/0150914 A1 | 5/2022 | Lee et al. | | |
| 2023/0354386 A1* | 11/2023 | Hui | ...................... | H04W 72/20 |

FOREIGN PATENT DOCUMENTS

| | | | |
|---|---|---|---|
| WO | WO-2020171679 A1 | 8/2020 | |
| WO | WO-2021034763 A1 | 2/2021 | |

* cited by examiner

Figure 3:
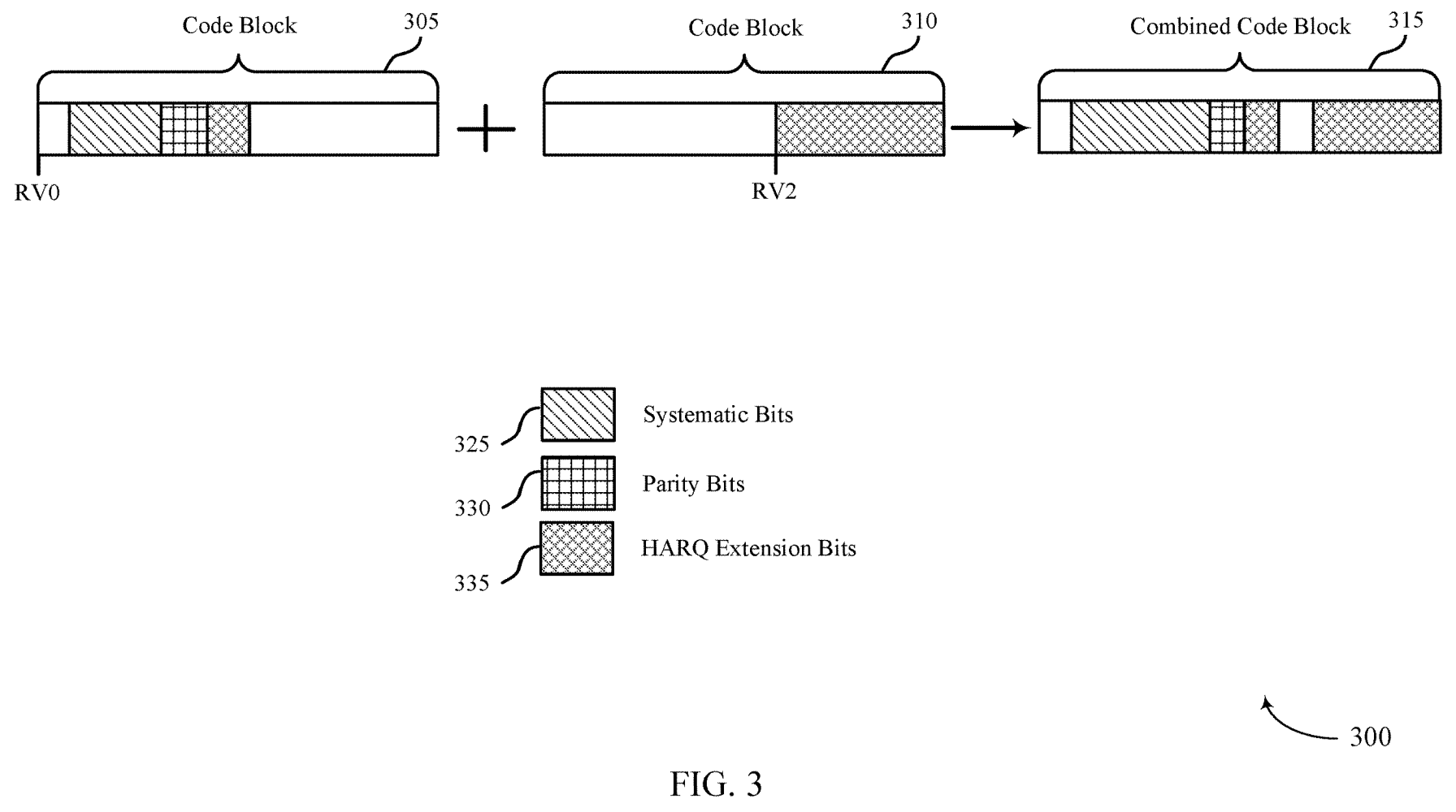

315

Combined Code Block

310

Code Block

RV2

305

Code Block

RV0

300

Systematic Bits

Parity Bits

HARQ Extension Bits

430    Systematic Bits

435    Parity Bits

440    HARQ Extension Bits

400

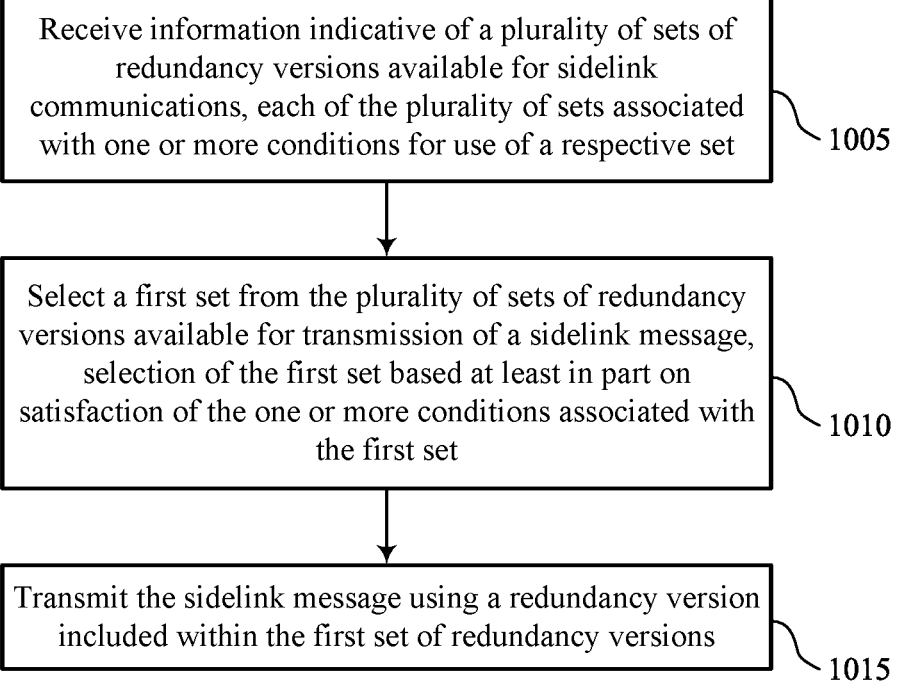

Receive information indicative of a plurality of sets of redundancy versions available for sidelink communications, each of the plurality of sets associated with one or more conditions for use of a respective set   1005

Select a first set from the plurality of sets of redundancy versions available for transmission of a sidelink message, selection of the first set based at least in part on satisfaction of the one or more conditions associated with the first set   1010

Transmit the sidelink message using a redundancy version included within the first set of redundancy versions   1015

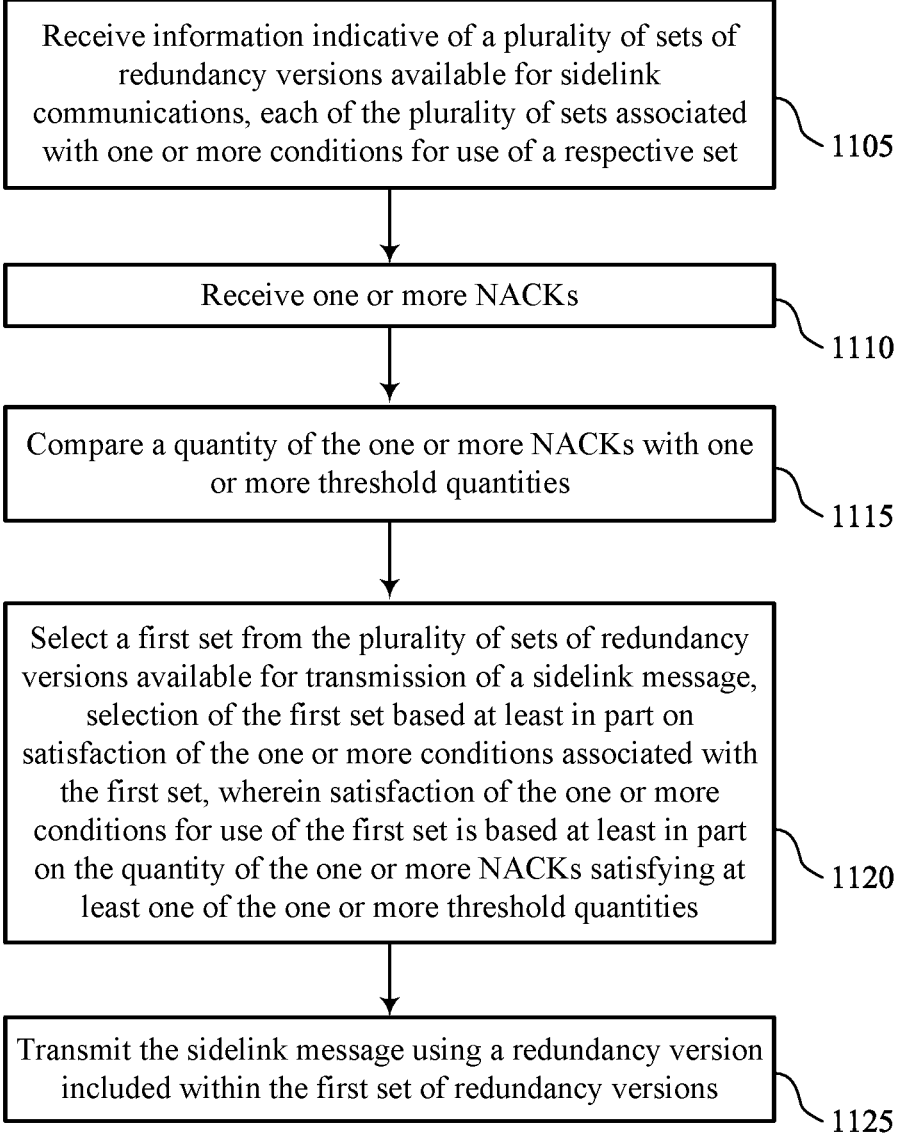

Receive information indicative of a plurality of sets of redundancy versions available for sidelink communications, each of the plurality of sets associated with one or more conditions for use of a respective set

⟋ 1105

Receive one or more NACKs

⟋ 1110

Compare a quantity of the one or more NACKs with one or more threshold quantities

⟋ 1115

Select a first set from the plurality of sets of redundancy versions available for transmission of a sidelink message, selection of the first set based at least in part on satisfaction of the one or more conditions associated with the first set, wherein satisfaction of the one or more conditions for use of the first set is based at least in part on the quantity of the one or more NACKs satisfying at least one of the one or more threshold quantities

⟋ 1120

Transmit the sidelink message using a redundancy version included within the first set of redundancy versions

REDUNDANCY VERSION SELECTION IN SIDELINK

FIELD OF TECHNOLOGY

The following relates to wireless communications, including redundancy version selection in sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication networks, devices may use low-density parity-check (LDPC) bits to communicate over a wireless channel.

SUMMARY

The described techniques relate to improved methods, systems, devices, and apparatuses that support redundancy version selection in sidelink. For example, improved techniques for selection of a redundancy version for sidelink wireless communications are described herein. In some examples, a transmitting user equipment (UE) may select a redundancy version from a set of redundancy versions to use for a sidelink transmission based on one or more conditions. The transmitting UE may receive information associated with (e.g., that configures) one or more sets of redundancy versions and one or more conditions associated with each set. The one or more sets of redundancy versions may, in some examples, include self-decodable redundancy versions, which may correspond to redundancy versions associated with a relatively high code rate. The transmitting UE may monitor conditions associated with current or scheduled wireless communications at the transmitting UE (e.g., sidelink communications). If the conditions are satisfied for a given set of redundancy versions, the transmitting UE may select a redundancy version from the set to use for a subsequent transmission. If the conditions are not satisfied for any of the sets of redundancy versions, the transmitting UE may select a redundancy version randomly or based on a defined rule or configuration to use for the subsequent sidelink transmission. By selecting a redundancy versions from a set of self-decodable redundancy versions based on the conditions, the transmitting UE may support improved reliability and throughput of wireless communications.

The conditions associated with a set of redundancy versions may include a level of system congestion measured by the transmitting UE, a quantity of negative acknowledgments (NACKs) received by the transmitting UE, whether feedback is enabled or disabled for a given transmission, whether a slot includes feedback resources, a code rate of a given transmission, a transmission priority, a cast type for a given transmission, a resource pool configuration, or any combination thereof. In some examples, the conditions may be enabled or disabled based on a resource pool configuration. For example, the conditions for a transmitting UE to use for redundancy version selection may be based on a resource pool via which the UE is scheduled to transmit the corresponding sidelink message.

A method for wireless communications at a UE is described. The method may include receiving information indicative of a set of multiple sets of redundancy versions available for sidelink communications, each of the set of multiple sets associated with one or more conditions for use of a respective set, selecting a first set from the set of multiple sets of redundancy versions available for transmission of a sidelink message, selection of the first set based on satisfaction of the one or more conditions associated with the first set, and transmitting the sidelink message using a redundancy version included within the first set of redundancy versions.

An apparatus for wireless communications at a UE is described. The apparatus may include a processor, memory coupled with the processor, and instructions stored in the memory. The instructions may be executable by the processor to cause the apparatus to receive information indicative of a set of multiple sets of redundancy versions available for sidelink communications, each of the set of multiple sets associated with one or more conditions for use of a respective set, select a first set from the set of multiple sets of redundancy versions available for transmission of a sidelink message, selection of the first set based on satisfaction of the one or more conditions associated with the first set, and transmit the sidelink message using a redundancy version included within the first set of redundancy versions.

Another apparatus for wireless communications at a UE is described. The apparatus may include means for receiving information indicative of a set of multiple sets of redundancy versions available for sidelink communications, each of the set of multiple sets associated with one or more conditions for use of a respective set, means for selecting a first set from the set of multiple sets of redundancy versions available for transmission of a sidelink message, selection of the first set based on satisfaction of the one or more conditions associated with the first set, and means for transmitting the sidelink message using a redundancy version included within the first set of redundancy versions.

A non-transitory computer-readable medium storing code for wireless communications at a UE is described. The code may include instructions executable by a processor to receive information indicative of a set of multiple sets of redundancy versions available for sidelink communications, each of the set of multiple sets associated with one or more conditions for use of a respective set, select a first set from the set of multiple sets of redundancy versions available for transmission of a sidelink message, selection of the first set based on satisfaction of the one or more conditions associated with the first set, and transmit the sidelink message using a redundancy version included within the first set of redundancy versions.

Some examples of the method, apparatuses, and non-transitory computer-readable medium described herein may further include operations, features, means, or instructions for receiving one or more NACKs and comparing a quantity of the one or more NACKs received within a predefined duration of time with a threshold quantity, where the satisfaction of the one or more conditions for use of the first set may be based on the quantity of the one or more NACKs satisfying the threshold quantity.

Some examples of the method, apparatuses, and non-transitory computer-readable medium described herein may further include operations, features, means, or instructions for receiving one or more NACKs and comparing a quantity of the one or more NACKs that may be consecutively received with a threshold quantity, where the satisfaction of the one or more conditions for use of the first set may be based on the quantity of the one or more NACKs satisfying the threshold quantity.

Some examples of the method, apparatuses, and non-transitory computer-readable medium described herein may further include operations, features, means, or instructions for receiving one or more NACKs and comparing a ratio of a first quantity of the one or more NACKs and a second quantity of positive acknowledgments (ACKs) received by the UE with a threshold ratio, where the satisfaction of the one or more conditions for use of the first set may be based on the ratio satisfying the threshold ratio.

Some examples of the method, apparatuses, and non-transitory computer-readable medium described herein may further include operations, features, means, or instructions for transmitting one or more first sidelink messages and monitoring for feedback in response to the one or more first sidelink messages, where the satisfaction of the one or more conditions for use of the first set may be based on a quantity of the one or more first sidelink messages for which feedback may be not received being greater than a threshold quantity.

Some examples of the method, apparatuses, and non-transitory computer-readable medium described herein may further include operations, features, means, or instructions for measuring system congestion at the UE, where the satisfaction of the one or more conditions may be based on a level of the measured system congestion satisfying a threshold level of system congestion.

Some examples of the method, apparatuses, and non-transitory computer-readable medium described herein may further include operations, features, means, or instructions for determining whether feedback associated with the sidelink message may be enabled or disabled, where the satisfaction of the one or more conditions associated with the first set may be based on the feedback being disabled.

Some examples of the method, apparatuses, and non-transitory computer-readable medium described herein may further include operations, features, means, or instructions for determining whether a slot associated with the sidelink message contains one or more physical sidelink feedback channel (PSFCH) resources, where the satisfaction of the one or more conditions associated with the first set may be based on the slot containing the one or more PSFCH resources.

Some examples of the method, apparatuses, and non-transitory computer-readable medium described herein may further include operations, features, means, or instructions for comparing a code rate for the sidelink message with a threshold code rate, where the satisfaction of the one or more conditions for use of the first set may be based on the code rate exceeding the threshold code rate.

Some examples of the method, apparatuses, and non-transitory computer-readable medium described herein may further include operations, features, means, or instructions for determining a transmission priority associated with the sidelink message, where the satisfaction of the one or more conditions may be based on the transmission priority exceeding a threshold transmission priority.

Some examples of the method, apparatuses, and non-transitory computer-readable medium described herein may further include operations, features, means, or instructions for determining a cast type associated with the sidelink message may be one of a broadcast type, a groupcast type, or a unicast type, where the satisfaction of the one or more conditions associated with the first set may be based on the cast type being the broadcast type or the groupcast type.

Some examples of the method, apparatuses, and non-transitory computer-readable medium described herein may further include operations, features, means, or instructions for determining a resource pool allocated for the sidelink message, where the one or more conditions for use of the first set may be based on the resource pool.

Some examples of the method, apparatuses, and non-transitory computer-readable medium described herein may further include operations, features, means, or instructions for receiving a control message that indicates the one or more conditions for use of the respective set.

In some examples of the method, apparatuses, and non-transitory computer-readable medium described herein, rate matching the sidelink message based on the redundancy version of the first set of redundancy versions.

In some examples of the method, apparatuses, and non-transitory computer-readable medium described herein, the first set of redundancy versions may include one or more self-decodable redundancy versions, each self-decodable redundancy version associated with a code rate that may be greater than a threshold code rate.

BRIEF DESCRIPTION OF THE DRAWINGS

FIG. 3 illustrates an example of a redundancy version encoding scheme that supports redundancy version selection in sidelink in accordance with one or more aspects of the present disclosure.

FIGS. 10 and 11 show flowcharts illustrating methods that support redundancy version selection in sidelink in accordance with one or more aspects of the present disclosure.

DETAILED DESCRIPTION

Figure 1:
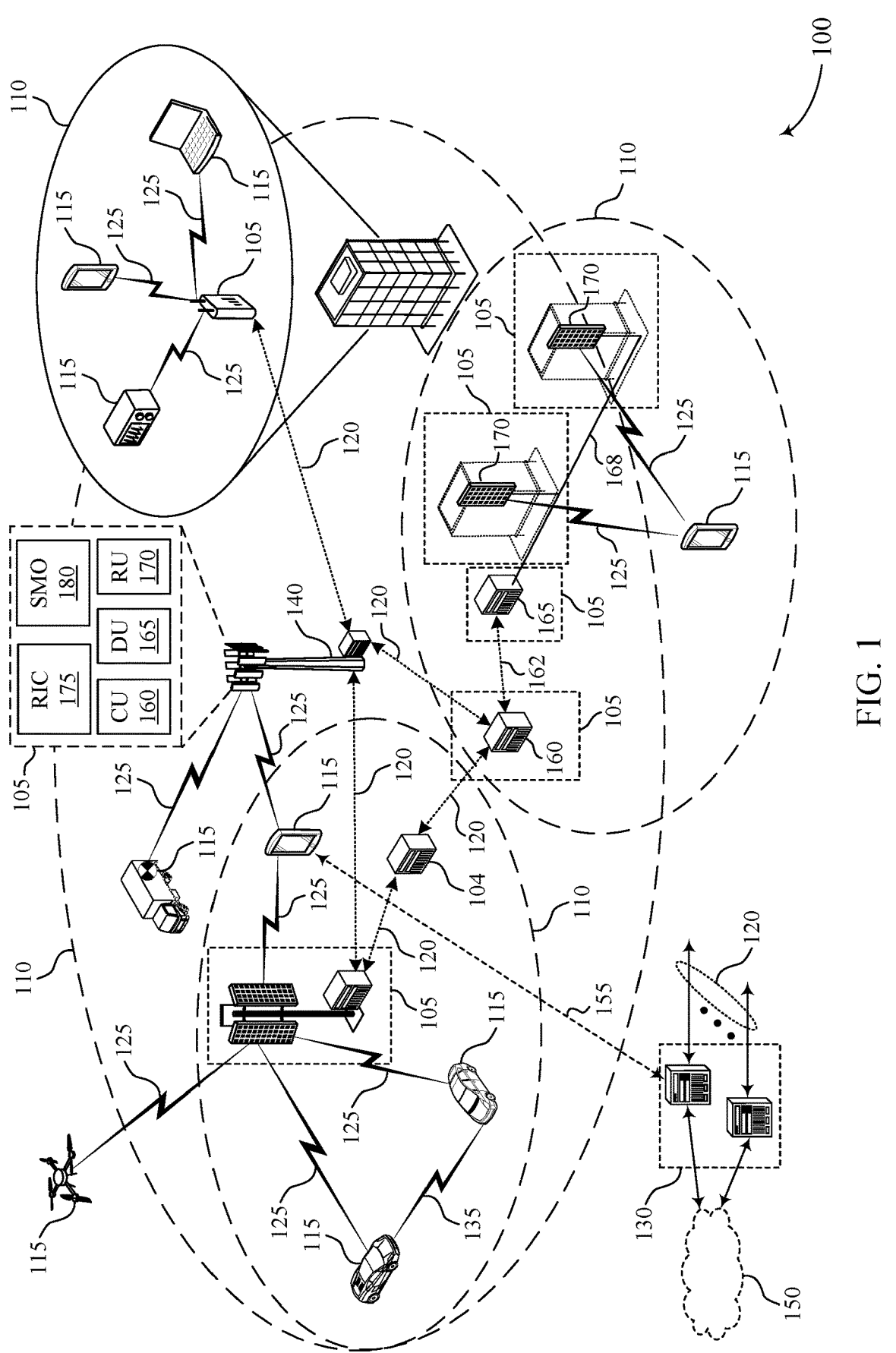
FIG. 1 illustrates an example of a wireless communications system that supports redundancy version selection in sidelink in accordance with one or more aspects of the present disclosure.

In some wireless systems, a device may use error correcting codes, such as turbo codes, low-density parity-check (LDPC) codes, or some other types of codes to encode or decode communications over a data channel. The device may use LDPC codes to detect and compensate for errors within the communications, such as errors due to noise in the transmission channel, or other factors. The device may use one or more techniques for rate matching data transmissions to decode communications, to perform error detection, to synchronize transmissions and receptions, or any combination thereof. In some examples, the device may utilize a conceptual circular buffer to perform rate matching. For example, the device may write an LDPC code block or codeword (e.g., a block or sequence of LDPC bits) into the conceptual circular buffer, and a receiving device may read a requisite number of coded bits from the circular buffer. LDPC coded bits may be based on a target code rate and a transport block length The receiving device may use the coded bits to perform error detection and to synchronize transmissions and receptions. In some examples, the transmitting device may determine a redundancy version to perform rate matching, and the transmitting device may indicate the redundancy version to the receiving device. The redundancy version may correspond to a starting location on the circular buffer. For example, a redundancy version may indicate a position or bit in the LDPC code block that may be a starting point for writing to and reading from the circular buffer.

Some redundancy versions may be associated with relatively high self-decodability, which may correspond to relatively high individual retransmission performance. Additionally, or alternatively, some redundancy versions may be associated with relatively high reliability when combined with other redundancy versions across one or more retransmissions. For uplink and downlink communications (e.g., via a Uu link), in some examples, a network entity may use one or more configured techniques (e.g., rules, procedures) to select a redundancy version for communications. However, for some sidelink communications, redundancy version selection by a UE may be ambiguous, random, or undefined. Additionally, or alternatively, the redundancy version selection by a sidelink UE may be based on a configured order. Such techniques may increase latency and reduce reliability and throughput of the sidelink communications.

Techniques are described herein to define redundancy version selection rules for sidelink communications. In some examples, a transmitting UE may select a redundancy version from a set of redundancy versions to use for a transmission to a receiving UE based on one or more conditions. The transmitting UE may receive information associated with (e.g., that configures) one or more sets of redundancy versions and one or more conditions associated with each set. One or more of the sets of redundancy versions may include self-decodable redundancy versions, which may correspond to redundancy versions associated with a relatively high code rate. The sets of redundancy versions may include one or more existing redundancy versions, one or more redundancy versions defined for improved self-decodability, or both. If the conditions are satisfied for a given set of redundancy versions, the transmitting UE may select a redundancy version from the set to use for a subsequent transmission. If the conditions are not satisfied for a given set of redundancy versions, the transmitting UE may select a redundancy version randomly from each available redundancy version for a subsequent transmission. By selecting self-decodable redundancy versions based on the conditions, the transmitting UE may increase the reliability and throughput of sidelink communications.

The conditions associated with a set of redundancy versions may include a level of system congestion measured by the transmitting UE, a quantity of negative acknowledgments (NACKs) received by the transmitting UE, whether feedback is enabled or disabled for a given transmission, whether a slot includes feedback resources, a code rate of a given transmission, a transmission priority, a cast type for a given transmission, a resource pool configuration, or any combination thereof. In some examples, the conditions may be enabled or disabled based on a resource pool configuration. For example, the conditions for a transmitting UE to use for redundancy version selection may be based on a resource pool via which the UE is scheduled to transmit the corresponding sidelink message.

Aspects of the disclosure are initially described in the context of wireless communications systems. Aspects of the disclosure are illustrated and descried with reference to a wireless communications system, a redundancy version encoding scheme, a circular buffer, and a process flow. Aspects of the disclosure are further illustrated by and described with reference to apparatus diagrams, system diagrams, and flowcharts that relate to redundancy version selection in sidelink.

FIG. 1 illustrates an example of a wireless communications system 100 that supports redundancy version selection in sidelink in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support redundancy version selection in sidelink as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some aspects, devices (e.g., UEs 115, network entities 105, or any other devices) in the wireless communications system 100 (e.g., a 5G NR system, or some other system) may use error correcting codes, such as turbo codes, LDPC codes, or some other types of codes to encode or decode communications over a data channel. For example, the LDPC codes may be used to detect and compensate for errors within the communications, such as errors due to noise in the transmission channel, or other factors. The device may use one or more techniques for rate matching data transmissions to decode communications, to perform error detection, to synchronize transmissions and receptions, or any combination thereof. In some examples, the device may utilize a conceptual circular buffer to perform rate matching. The circular buffer may be a representation of a set of LDPC bits.

For example, for a given transmission, a transmitting device may write an LDPC code block or codeword (e.g., a block or sequence of LDPC bits) into the conceptual circular buffer, and a receiving device may read a quantity of coded bits from the circular buffer. The LDPC code block and a corresponding LDPC base graph may include sets of encoded bits, such as systematic bits, parity bits (e.g., degree two and degree three bits), and HARQ extension bits (e.g., degree one bits). In some examples, the systematic bits and the parity bits may be used to transmit a first transmission of information and the HARQ extension bits may be used for retransmissions of the information. For example, the systematic bits and the parity bits may provide for the receiving device to decode the information included in the transmission, while the HARQ extension bits may, in some examples, not be sufficient for the receiving device to accurately decode the information. However, the HARQ extension bits may provide for improved accuracy and throughput of communications when used for a retransmission of the information. In some examples, one or more systematic bits at the beginning of an LDPC code may be punctured to increase code rate (e.g., because the punctured bits in an LDPC base graph may be more easily decoded than other bits included in the LDPC codes). The receiving device, such as another UE 115, may use the coded bits to perform error detection and to synchronize transmissions and receptions.

In some examples, the transmitting device may determine a redundancy version to perform rate matching, and the transmitting device may indicate the redundancy version to the receiving device. The redundancy version may correspond to a starting location on the circular buffer. For example, a redundancy version may indicate a position or bit in the LDPC code block that may be a starting point for writing to and reading from the circular buffer. Different redundancy versions may indicate starting points at different locations of the code block (e.g., at a quarter length, a half length, or other portions of a length of the code block). Different redundancy versions may provide for varying levels of reliability associated with decoding the LDPC code block for transmissions or retransmissions. For example, some redundancy versions (e.g., a redundancy version RV0 or RV3) may be associated with relatively high self-decodability, which may correspond to relatively high individual transmission performance. A self-decodable redundancy version may be associated with a relatively high code rate, such that using the redundancy version to encode and decode a single transmission may improve reliability and throughput of the individual transmission.

Additionally, or alternatively, some redundancy versions may be associated with improved performance when combined with other redundancy versions across one or more retransmissions (e.g., a combination of redundancy versions RV0 and RV2, or some other combination of redundancy versions). For example, a receiving device may decode a first portion of a codeword based on a first transmission and a first redundancy version, and the receiving device may decode a second portion of the codeword based on a second retransmission and a second redundancy version. The receiving device may combine the first and second portions of the codeword to accurately decode the information.

For uplink and downlink communications (e.g., via a Uu air interface link), in some examples, a network entity 105 may use one or more configured techniques (e.g., rules, procedures) to select a redundancy version for communications with a UE 115 and to determine a quantity of coded bits to include in the LPDC code block (e.g., a circular buffer length). However, for some sidelink communications, redundancy version selection by a UE 115 may be ambiguous, random, or undefined. Additionally, or alternatively, the redundancy version selection by a sidelink UE 115 may be based on a configured order. Such techniques may increase latency and reduce reliability and throughput of the sidelink communications.

Techniques are described herein to define redundancy version selection rules for sidelink communications. In some examples, a transmitting UE 115 may select a redundancy version from a set of redundancy versions to use for a transmission to a receiving UE 115 based on one or more conditions. The transmitting UE 115 may receive information from a network entity 105 that is associated with (e.g., that configures) the sets of redundancy version and that indicates conditions associated with each set. The set of redundancy versions may include one or more existing redundancy versions, one or more redundancy versions defined for improved self-decodability, or both. If the conditions are satisfied for a given set of redundancy versions, the transmitting UE 115 may select a redundancy version from the set of redundancy versions to use for a subsequent transmission. If the conditions are not satisfied for any set of redundancy versions, the transmitting UE 115 may select a redundancy version randomly from any available redundancy version. The described techniques for redundancy version selection for sidelink communications may improve network performance, decrease overhead at the transmitting UE 115, reduce network resource utilizations, and decrease latency in the wireless communications system 100.

Figure 2:
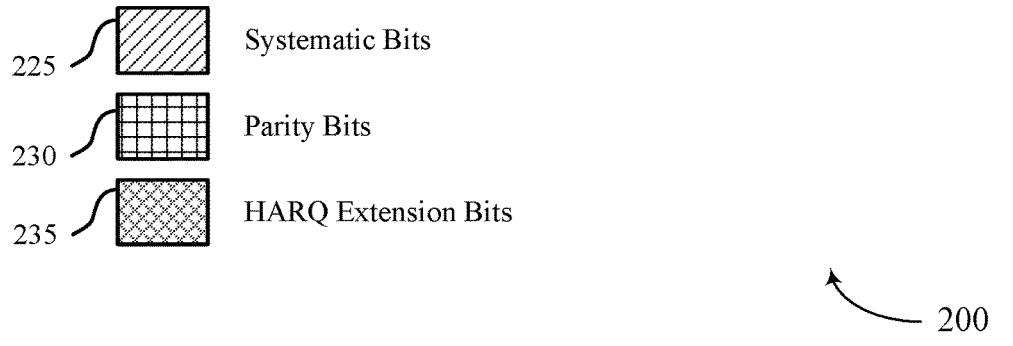
FIG. 2 illustrates an example of a wireless communications system that supports redundancy version selection in sidelink in accordance with one or more aspects of the present disclosure.

FIG. 2 illustrates an example of a wireless communications system 200 that supports redundancy version selection in sidelink in accordance with one or more aspects of the present disclosure. In some examples, the wireless communications system 200 may implement aspects of the wireless communication system 100 as described with reference to FIG. 1. For example, the wireless communication system 200 may include a network entity 105-a and UEs 115-a and 115-b. The network entity 105-a may represent an example of a network entity 105 as described with reference to FIG. 1. The UE 115-a and the UE 115-b may represent examples of a UE 115 as described with reference to FIG. 1.

The network entity 105-a may communicate with the UE 115-a, the UE 115-b, or both, via the communication links 215-a and 215-b, respectively (e.g., Uu links) and within a geographic coverage area 110-a. Additionally, or alternatively, the UE 115-a and the UE 115-a may communicate with each other via the sidelink communication link 205 (e.g., a PC5 interface). The UE 115-a and the UE 115-b may support techniques for redundancy version selection for sidelink communications as described herein.

The UE 115-a and the UE 115-b may use LDPC codes to encode or decode communications over a sidelink data channel. The UE 115-a may represent an example of a transmitting device and the UE 115-b may represent an example of a receiving device, or vice versa. To encode a transport block for a sidelink transmission, the UE 115-a may segment the transport block into a quantity of information blocks, which may each include one or more coded bits. The information blocks may be encoded by an LDPC encoder at the UE 115-a to generate one or more codewords (e.g., code blocks 210) corresponding to the information blocks. The LDPC encoder (e.g., circuitry or logic at the UE 115-a) may utilize a base graph for encoding the information blocks. The base graph may be selected from at least two base graph options (e.g., a nested family of base graphs) having different ranges of graph dimensions based on a length of the transport block (K), a length of the information block, a target code rate (R), or any combination thereof.

Each base graph and corresponding code block 210 may include sets of encoded bits, such as systematic bits 225, parity bits 230 (e.g., degree two and degree three parity nodes), HARQ extension bits 235 (e.g., degree one parity nodes), or any combination thereof. In some examples, some systematic bits 225 may be punctured at the beginning of the code block 210. For example, one or more of the systematic bits 225 may be removed after encoding (e.g., prior to transmission) to increase a code rate, reduce redundancy, or both. The HARQ extension bits 235 may provide for incremental redundancy (IR) HARQ transmissions and may be associated with a relatively low code rate. By extending a base graph with HARQ extension bits 235, a range of code rates supported by the base graph may be extended. Such HARQ extension bits 235 may, for example, be utilized for performing retransmissions of a message.

In the example of FIG. 2, the UE 115-a may use a circular buffer 220 to perform rate matching to encode or decode communications, to perform error detection, to synchronize transmissions and receptions with the UE 115-b, or any combination thereof. For example, the UE 115-a may write the encoded bits from the code block 210 to the circular buffer 220 and the UE 115-b (e.g., a receiving device) may read the encoded bits from the circular buffer 220. Transmissions encoded using the circular buffer 220 may be associated with a code rate. The code rate for a given transmission may be based on a ratio of a quantity of systematic bits 225 in the circular buffer 220 and a length of the circular buffer 220, which may be configurable by the transmitting UE 115-a or some other device. The code rate for a code block 210 may be determined prior to puncturing of any bits in the code block 210 and may be associated with a respective base graph (e.g., including HARQ extension bits 235) and information block size (e.g., a quantity of systematic bits 225, a quantity of parity bits 230, or both).

The UE 115-a may begin writing to the circular buffer 220 at a first location in the circular buffer 220, and the UE 115-a may write the encoded bits from the code block 210 into the circular buffer 220 in a clockwise direction. In some examples, the UE 115-a may write the systematic bits 225, the parity bits 230, and the HARQ extension bits 235 from the code block 210 into the circular buffer 220 until the end of the code block 210 is reached or until the circular buffer 220 has no available space (e.g., data allocation) remaining. The receiving UE 115-b may read the encoded bits from the circular buffer 220 starting from the same starting location, such that the transmission may be synchronized between the transmitting and receiving UEs 115. The circular buffer 220 may correspond to a conceptual buffer used to perform rate matching and synchronization between the devices.

The starting location at which the UE 115-*a* begins writing the encoded bits to the circular buffer 220 and the UE 115-*b* begins reading the encoded bits from the circular buffer 220 for a given sidelink transmission may be based on a redundancy version (e.g., RV0, RV1, RV2, RV3, or some other redundancy version). The UE 115-*a* may indicate the redundancy version to the UE 115-*b* as a part of the sidelink transmission. In the example of FIG. 2, the UE 115-*a* may start writing the code block 210 into the circular buffer 220 at RV0, which may indicate a first position in the code block 210 for writing to and reading from the circular buffer 220. Different redundancy versions may indicate starting points at different locations of the code block 210. Example redundancy version configurations are described in further detail elsewhere herein, including with reference to FIGS. 3 and 4.

Some redundancy versions may be associated with relatively high self-decodability. Self-decodable redundancy versions may be associated with a relatively high code rate and a relatively high individual retransmission performance. For example, the redundancy versions RV0 and RV3 illustrated in FIG. 2 may be associated with higher self-decodability than the redundancy versions RV1 and RV2, in some examples, due to the location of the RV0 and the RV3 in the circular buffer 220 relative to the systematic bits 225. If RV0 or RV3 are used for encoding and decoding, at least a portion of the systematic bits 225 are likely to be read and decoded by the receiving UE 115-*b*, which may improve reliability of the decoding process. The receiving UE 115-*b* may thereby decode the systematic bits 225 at a relatively high code rate (e.g., faster or sooner) using the RV0 and the RV3 as compared with other redundancy versions, which may improve decoding accuracy.

Some redundancy versions may provide for an increased combining gain when combined across two or more retransmissions of a sidelink message (e.g., RV0 and RV2). For example, the redundancy version RV2 illustrated in FIG. 2 may, in some examples, be associated with relatively low self-decodability, but may be associated with improved decoding reliability and throughput when used in combination with one or more other redundancy versions. If the RV2 is used for a retransmission of a previously transmitted sidelink message, the UE 115-*b* may combine bits decoded from the previous transmission with bits (e.g., HARQ extension bits 235) decoded based on the RV2 used for the retransmission to decode the sidelink transmission with relatively high accuracy. Tradeoffs between self-decodability and combining gain are describe in further detail elsewhere herein, including with reference to FIG. 3.

To perform a downlink transmission to a UE 115 via a communication link 215, the network entity 105-*a* may select a redundancy version randomly or based on one or more rules or procedures. The network entity 105-*a* may insert a quantity of coded bits in a code block 210 based on the selected redundancy version and a length of a corresponding circular buffer 220. For some sidelink communications, redundancy version selection by a UE 115 may be ambiguous, random, or undefined. Additionally, or alternatively, the redundancy version selection by a sidelink UE 115 may be based on a configured order. However, such techniques for redundancy version selection in sidelink may reduce throughput and reliability of sidelink communications. For example, in some scenarios, the UE 115-*a* may not receive feedback on a first transmission of a message or may otherwise be unable to retransmit the message to the UE 115-*b*. In such cases, if the UE 115-*a* randomly selects a redundancy version that is not self-decodable, the transmission may not be decoded accurately. Additionally, or alternatively, in some examples, IR gain across multiple transmissions may be beneficial for a given transmission, but the UE 115-*a* may be unable to ensure that a randomly selected redundancy version may support relatively high combining gain. As such, ambiguous redundancy version selection may result in increased latency and reduced reliability and throughput of the sidelink communications.

Techniques are described herein to define redundancy version selection rules for sidelink communications. For example, one or more sets of redundancy versions may be configured for the UE 115-*a*. Each set of redundancy version may be associated with a respective set of one or more conditions for use of the set. In some examples, the configured sets of redundancy versions may include one or more sets of self-decodable redundancy versions for use in scenarios in which retransmissions may not be used, and self-decodability may otherwise be beneficial. The UE 115-*a* may determine which set of redundancy versions to use based on whether corresponding sets of conditions are satisfied.

The sets of redundancy versions and corresponding conditions may be indicated to the UE 115-*a* or configured at the UE 115-*a* (e.g., based on a defined rule). In some examples, the UE 115-*a* may receive redundancy version configuration information 245 from the network entity 105-*a* or some other network node that indicates the sets of redundancy versions and corresponding conditions. The sets of redundancy versions may include one or more of the RV0, the RV1, the RV2, and the RV3 (e.g., redundancy versions used for sidelink, uplink, and/or downlink communications), one or more redundancy versions defined for self-decodability (e.g., combinations of redundancy versions or other newly defined redundancy versions), or any combination thereof.

In some examples, the one or more conditions for utilization of a set of self-decodable redundancy versions may include a level of system congestion measured by the UE 115-*a*. The UE 115-*a* may perform system congestion measurements (e.g., lower layer measurements), such as channel busy ratio (CBR) measurements, channel utilization ratio (CR) measurements, or both. To measure CBR, the UE 115-*a* may monitor sidelink resources within a window of time. The UE 115-*a* may determine a ratio of a quantity of resources that are occupied by other UEs 115 to a quantity of available resources to estimate congestion in the channel. To measure CR, the UE 115-*a* may measure a quantity of resources used by the UE 115-*a* within a time period.

The UE 115-*a* may compare the measured or estimated level of system congestion with a threshold level. If the level of the system congestion is greater than or equal to the threshold, the UE 115-*a* may be allocated a reduced quantity of transmissions. As such, the UE 115-*a* may determine to use a set of redundancy versions that are associated with relatively high self-decodability (e.g., instead of relatively high combining gain) for the reduced transmissions. Selecting the set of self-decodable redundancy versions may increase the reliability of an individual transmission, which may be beneficial as retransmissions may further increase system congestion.

In some examples, the one or more conditions may be based on one or more feedback messages 240 from the UE 115-*b*. For example, the UE 115-*a* may transmit one or more sidelink messages or other communications to the UE 115-*b*.

The UE 115-*b* and/or one or more other UEs 115 may transmit feedback messages 240 to the UE 115-*a* in response to the sidelink messages. The feedback messages 240 may include positive acknowledgments (ACKs) or NACKs to indicate whether the respective sidelink message was received and decoded successfully or not. A NACK may indicate that the UE 115-*b* failed to decode the sidelink message, but that the UE 115-*b* may be able to receive and decode control information, which may indicate a problem with the data link.

As such, an example of a condition for use of a given set of redundancy versions associated with relatively high IR gain may be a quantity of NACKs. The UE 115-*a* may determine a quantity of NACKs received within a predefined duration of time. If the quantity of NACKs is less than a threshold quantity, the UE 115-*a* may determine to use the set of self-decodable redundancy versions. If the quantity of NACKs is greater than or equal to the threshold quantity, the UE 115-*a* may determine to use a set of redundancy versions associated with higher combining gain across retransmissions. Additionally, or alternatively, the UE 115-*a* may determine a quantity of NACKs that are received consecutively (e.g., without receiving an ACK) from a same UE 115 or multiple UEs 115. The UE 115-*a* may compare the quantity of consecutive NACKs to a threshold. If the quantity of consecutive NACKs is less than the threshold, the UE 115-*a* may determine to use the self-decodable redundancy versions. If the quantity of consecutive NACKs is greater than or equal to the threshold quantity, the UE 115-*a* may determine to use a set of redundancy versions associated with higher combining gain across retransmissions.

In some other examples, the UE 115-*a* may determine a ratio of a first quantity of NACKs received by the UE 115-*a* and a second quantity of ACKs received by the UE 115-*a*. The UE 115-*a* may compare the ratio to a threshold ratio. If the ratio is less than the threshold ratio, the UE 115-*a* may determine to use the set of self-decodable redundancy versions. If the ratio is greater than or equal to the ratio, the UE 115-*a* may determine to use a set of redundancy versions associated with higher combining gain across retransmissions. The threshold quantities of NACKs, the threshold ratio, or both may be indicated to the UE 115-*a* via control signaling (e.g., the redundancy version configuration information 245), configured at the UE 115-*a*, or based on a resource pool configuration.

In another example, the one or more conditions may include a quantity of feedback messages 240 that are not received by the UE 115-*a* when expected, such as for discontinuous transmission (DTX) communications, or other sidelink communications for which positive and negative feedback may be enabled or configured. The UE 115-*a* may monitor for feedback messages 240 and may determine a quantity of sidelink messages for which a feedback message 240 is not received. The UE 115-*a* may compare the quantity with a threshold quantity. If the quantity is greater than or equal to the threshold quantity, the UE 115-*a* may determine to select the set of self-decodable redundancy versions. By selecting from the set of self-decodable redundancy versions for a subsequent transmission, the UE 115-*a* may increase reliability of the subsequent sidelink transmission.

In some examples, the one or more conditions for utilization of a set of self-decodable redundancy versions may be based on whether feedback is enabled or disabled for a sidelink transmission. Feedback may be disabled based or enabled based on a resource pool configuration, a transmitter quality of service (QoS) protocol, or both. If a sidelink transmission is scheduled to be transmitted via a resource pool and the resource pool configuration disables feedback (e.g., by disabling feedback resources), the UE 115-*a* may determine to select the set of self-decodable redundancy versions. If the QoS of the UE 115-*a* determines that feedback is disabled for a given sidelink transmission, the UE 115-*a* may determine to use the set of self-decodable redundancy versions.

In some examples, the one or more conditions may include whether a sidelink transmission is scheduled to be transmitted via a slot that includes physical sidelink feedback channel (PSFCH) resources. The PFSCH resources may be allocated in two or more OFDM symbols of a slot. In some examples, the PSFCH resources may occur in each slot scheduled for sidelink transmissions or intermittently based on a configured periodicity, such as every other slot, every fourth slot, or the like. Additionally, or alternatively, the PFSCH resource may be disabled by the resource pool configuration for one or more slots.

The UE 115-*a* may select sidelink resources for one or more sidelink transmissions randomly. As such, the UE 115-*a* may not be able to select a slot with PFSCH resources. If the UE 115-*a* transmits the sidelink transmission via a slot with PSFCH resources, the UE 115-*a* may utilize a relatively high target code rate for the transmission because the slot may include fewer physical sidelink shared channel (PSSCH) resources, fewer physical sidelink control channel (PSCCH) resources, or both than a slot that does not include the PFSCH resources. The UE 115-*a* may thus determine to use a set of self-decodable redundancy versions if a sidelink transmission is scheduled via a slot with PSFCH resources, and the UE 115-*a* may use self-decodable redundancy versions or other redundancy versions for slots that do not include PSFCH resources.

In some examples, the one or more conditions for use of a set of self-decodable redundancy versions may include a target code rate or an effective code rate of a sidelink transmission. The target code rate may be a code rate that is signaled via a modulation and coding scheme (MCS) field in the sidelink transmission. The effective code rate may be a ratio of the number of information bits and the number of coded bits in the sidelink transmission. In some examples, the effective code rate may be different than the target code rate. The UE 115-*a* may determine whether the target code rate satisfies a first threshold, whether the effective code rate satisfies a second threshold, or both. The thresholds may be indicated to the UE 115-*a* via control signaling or a configuration (e.g., a (pre-)configuration). If one or both of the target code rate and the effective code rate is greater than or equal to the respective threshold, the UE 115-*a* may determine to use the set of self-decodable redundancy versions. If one or both of the target code rate and the effective code rate is less than the respective threshold, the UE 115-*a* may select any redundancy version or the UE 115-*a* may use a set of redundancy versions optimized for improved IR gain.

In some examples, the one or more conditions for use of the set of self-decodable redundancy versions may include a transmission priority of the sidelink transmission. The transmission priority may be signaled via first stage control information (e.g., sidelink control information (SCI)-1) and may be part of a QoS for the packet. In some examples, transmission priority may be related to a quantity of retransmissions. For example, packets with relatively high priorities may be transmitted more times than packets with relatively low priorities. In some examples, if the UE 115-*a* determines that a sidelink transmission is associated with a transmission priority that is greater than a threshold priority, the UE 115-a may determine to use the set of self-decodable redundancy versions (e.g., if there are a relatively large quantity of neighboring UEs 115 in the system). Additionally, or alternatively, if the UE 115-a determines that a sidelink transmission is associated with a transmission priority that is greater than a threshold priority, the UE 115-a may determine to use a set of redundancy versions associated with relatively high IR gain (e.g., if the UE 115-a is able to perform multiple retransmissions).

In some examples, the one or more conditions for use of the set of self-decodable redundancy versions may be based on a cast type of the sidelink transmission, such as broadcast, groupcast or unicast. If the sidelink transmission is a unicast message to a single UE 115, feedback may be enabled for the transmission. If the sidelink transmission is a broadcast message or a groupcast message to multiple UEs 115, feedback may not be enabled, and the UE 115-a may be unaware of a quantity of other UEs 115 or transmissions by the other UEs 115, which may result in interference. As such, if the UE 115-a transmits the sidelink transmission as a broadcast or groupcast message, the UE 115-a may determine to use the set of self-decodable redundancy versions.

In some examples, the one or more conditions may be based on a resource pool configuration. For example, some resource pools may be configured with one or more conditions or may be configured with a respective set of redundancy versions (e.g., a resource pool for self-decodable redundancy versions). Additionally, or alternatively, the conditions may be enabled or disabled based on a resource pool configuration. For example, a resource pool configuration may indicate one or more conditions to use for selecting a set of redundancy versions. The UE 115-a may thus determine satisfaction of the conditions based on a configuration for a resource pool via which the UE 115-a may transmit a sidelink message.

The conditions for a given set of redundancy version may include a single condition or a combination of any two or more conditions described herein. For example, a level of system congestion and another condition, such as a presence of PSFCH resources, may be combined. In such cases, the UE 115-a may determine to use the set of redundancy versions if both of the conditions are satisfied. The conditions may be configured for the UE 115-a (e.g., (pre-) configured via an RRC configuration loaded on the device) or indicated to the UE 115-a via control signaling from the network entity 105-a. For example, the network entity 105-a may broadcast a control message (e.g., an RRC configuration) to the UE 115-a, the UE 115-b, and one or more other UEs 115 in the geographic coverage area 110-a. The control message may configure the conditions, the thresholds associated with the conditions, or both. In some examples, the control message may be or may include the redundancy version configuration information 245 and may configure the sets of redundancy versions in addition to the conditions.

If the conditions are satisfied for a given set of redundancy versions, the UE 115-a may select a redundancy version from the set of redundancy versions to use for transmitting a sidelink message. If the conditions are not satisfied for one of the sets of redundancy versions indicated via the redundancy version configuration information 245, the UE 115-a may select a default redundancy version or some other redundancy version available for the transmission. By utilizing the configured sets of redundancy versions based on the corresponding conditions, the UE 115-a as described herein may select redundancy versions that may improve throughput and reliability of the communications in a given scenario. The described techniques may thus improve throughput and reliability of sidelink communications.

FIG. 3 illustrates an example of a redundancy version encoding scheme 300 that supports redundancy version selection in sidelink in accordance with one or more aspects of the present disclosure. In some examples, redundancy version encoding scheme 300 may implement or be implemented by aspects of wireless communication systems 100 or 200 as described with reference to FIGS. 1 and 2. For example, the redundancy version encoding scheme 300 illustrates examples of series of encoded and/or decoded bits when different redundancy versions are used. The code blocks illustrated in FIG. 3 may be transmitted and received by a transmitting device and a receiving device, respectively, which may represent examples of sidelink UEs 115 or other network entities 105, such as a transmitting UE 115-a and a receiving UE 115-b, as described with reference to FIGS. 1 and 2. FIG. 3 illustrates example code blocks 305, 310, and 315 that may be generated based on respective redundancy versions (e.g., RV0, RV2, RV0 and RV2, or some other redundancy versions). The code blocks 305, 310, and 315 may represent examples of the code block 210 described with reference to FIG. 2.

As described with reference to FIG. 2, a transmitting UE 115 as described herein may select a redundancy version to use for encoding a transmission from a set of one or more redundancy versions based on one or more conditions. The set of redundancy versions may, in some examples, be configured to include self-decodable redundancy versions for improved throughput and individual transmission performance when the corresponding conditions are satisfied. FIG. 3 illustrates an example of encoding and decoding performance for a self-decodable redundancy version RV0, for an IR-based redundancy version RV2, and encoding and decoding performance when two redundancy versions are combined across two retransmissions.

The code block 305 may represent a first set of encoded bits that may be written into the circular buffer and read from the circular buffer for a first transmission using a first redundancy version, such as RV0. The code block 310 may represent a second set of encoded bits that may be written into the circular buffer and read from the circular buffer for a retransmission using a second redundancy version, such as RV2. The code block 315 may represent an example of a combined set of bits that may be decoded by a receiving UE 115 based on the transmission associated with RV0 and the retransmission associated with RV2. That is, the code block 315 may be a conceptual code block that represents a combination of the first set of bits decoded from the first code block 305 and the second set of bits decoded from the second code block 310. Each of the first and second sets of bits may include systematic bits 325, parity bits 330, HARQ extension bits 335, or any combination thereof, as described with reference to FIG. 2. The patterned bits in each code block illustrated in FIG. 3 may represent bits that are written into and read from the circular buffer for each given transmission. The non-patterned or shaded bits within each code block may represent bits that are not written in to or read from the circular buffer, which may be referred to as punctured bits, in some examples.

In the example of FIG. 3, for a first transmission using the code block 305, the transmitting UE 115 may write, starting at the starting location corresponding to RV0, a set of systematic bits 325, a set of parity bits 330, and a set of HARQ extension bits 335 into the circular buffer. In some examples, the RV0 may be associated with a starting location that is the same as a starting bit of the set of systematic bits 325 in the code block 305. However, a first subset of the systematic bits 325 may be punctured to improve code rate, as described with reference to FIG. 2. In some aspects, the HARQ extension bits 335 may not be written into the circular buffer when RV0 is used (not pictured in FIG. 2). For example, if a code rate is relatively low for the corresponding transmission, the transmitting UE 115 may write the systematic bits 325 and the parity bits 330 before reaching an end of the circular buffer. Additionally, or alternatively, some or all of the HARQ extension bits 335 may be written into the circular buffer, as illustrated in FIG. 3.

For a second transmission using the code block 310 and a second redundancy version RV2, the transmitting UE 115 may write a set of HARQ extension bits 335 starting at the location corresponding to RV2 in the code block 310. In the example of FIG. 3, the transmitting UE 115 may write all of the HARQ extension bits 335 following the starting location into the circular buffer and the circular buffer may be full. Thus, the transmitting UE 115 may not write other types of encoded bits from the code block 310 into the circular buffer. Although other types of encoded bits are not illustrated in the code block 310, it is to be understood that in some examples, a transmitting UE 115 may write one or more systematic bits 325, parity bits 330, or both into the circular buffer, depending on a code rate for the transmission and a size of the circular buffer. For example, the transmitting UE 115 may transmit each of the HARQ extension bits 335 following the starting position associated with RV2 and continue to the beginning of the code block 310 to transmit one or more systematic bits 325 until the circular buffer is full.

A receiving UE 115 may receive the first transmission and decode the first set of bits illustrated in the code block 305 from the circular buffer based on the RV0. The receiving UE 115 may subsequently receive the retransmission and decode the second set of bits illustrated in the code block 310 from the circular buffer based on the RV2. In some examples, the transmitting UE 115 may indicate the RV0 and the RV2 to the receiving UE 115 via the transmission and the retransmission, respectively. The receiving UE 115 may combine the bits decoded from the transmission with the bits decoded from the retransmission to determine a total quantity of decoded bits. As illustrated by the patterned bits in the code block 315, the total quantity of decoded bits may include a relatively large portion of the bits in the original code block (e.g., the code block 210 illustrated in FIG. 2). Thus, the receiving UE 115 may receive and decode the information from the transmitting UE 115 with relatively high reliability and accuracy using the combination of the RV0 and the RV2. It is to be understood that the RV0 and RV2 and the corresponding quantities of decoded bits are examples, and any combination of redundancy versions may be used across any quantity of retransmissions.

The RV0 and the RV2 illustrated in FIG. 3 may correspond to different decoding performances when utilized individually than when utilized in combination. For example, the RV2 may be associated with a relatively low self-decodability when used individually. If the transmitting UE 115 transmits a single transmission using the RV2, the receiving UE 115 may decode the HARQ extension bits 335, but the receiving UE 115 may not decode the systematic bits 325 or the parity bits 330, as illustrated in the code block 310. As described with reference to FIG. 2, decoding performance and reliability may be relatively low when HARQ extension bits 335 are used. Thus, the receiving UE 115 may be unable to decode the enclosed information accurately, or at all. However, the HARQ extension bits 335 may provide for higher IR and combining gain, such that RV2 may be beneficial when used in combination with another redundancy version.

Alternatively, if the transmitting UE 115 transmits a single transmission using the RV0, the transmission may be decodable by the receiving UE 115 individually (e.g., self-decodable). For example, the receiving UE 115 may decode the set of bits illustrated in the code block 305, which may include systematic bits 325, parity bits 330, or both (e.g., at least some systematic bits) using the RV0. The systematic bits 325 may be sufficient for the receiving UE 115 to decode the code block and receive the corresponding transmission.

In some cases, a receiving UE 115 may be unable to combine redundancy versions across multiple code blocks. For example, retransmissions may not be permitted or supported based on a given transmission type or priority, a level of system congestion, or feedback configurations, such that a transmitting UE 115 may transmit information to a receiving UE 115 via a single transmission without retransmissions. In such cases, selection of a non-self-decodable redundancy version may provide for reduced throughput and reliability of the transmission. In some other cases, if the transmitting UE 115 is able to support retransmissions, utilizing redundancy versions optimized for relatively high IR gain may improve reliability and throughput.

Techniques described herein provide for a configuration of one or more sets of self-decodable redundancy versions and conditions for use of each set. If a transmitting UE 115 is scheduled to transmit a sidelink message, the transmitting UE 115 may monitor for one or more conditions associated with each configured set of redundancy versions. If conditions for a given set are satisfied, the transmitting UE 115 may select a redundancy version from that set to use for transmitting the message. For example, in a case where the transmitting UE 115 may transmit a single transmission, the transmitting UE 115 may select a redundancy version from a set of self-decodable redundancy versions, which may correspond to a redundancy version associated with a relatively high code rate. The conditions may correspond to the conditions described with reference to FIG. 2, among other examples. Such techniques may decrease overhead and latency, as well as improve throughput and reliability of sidelink communications.

Figure 4:
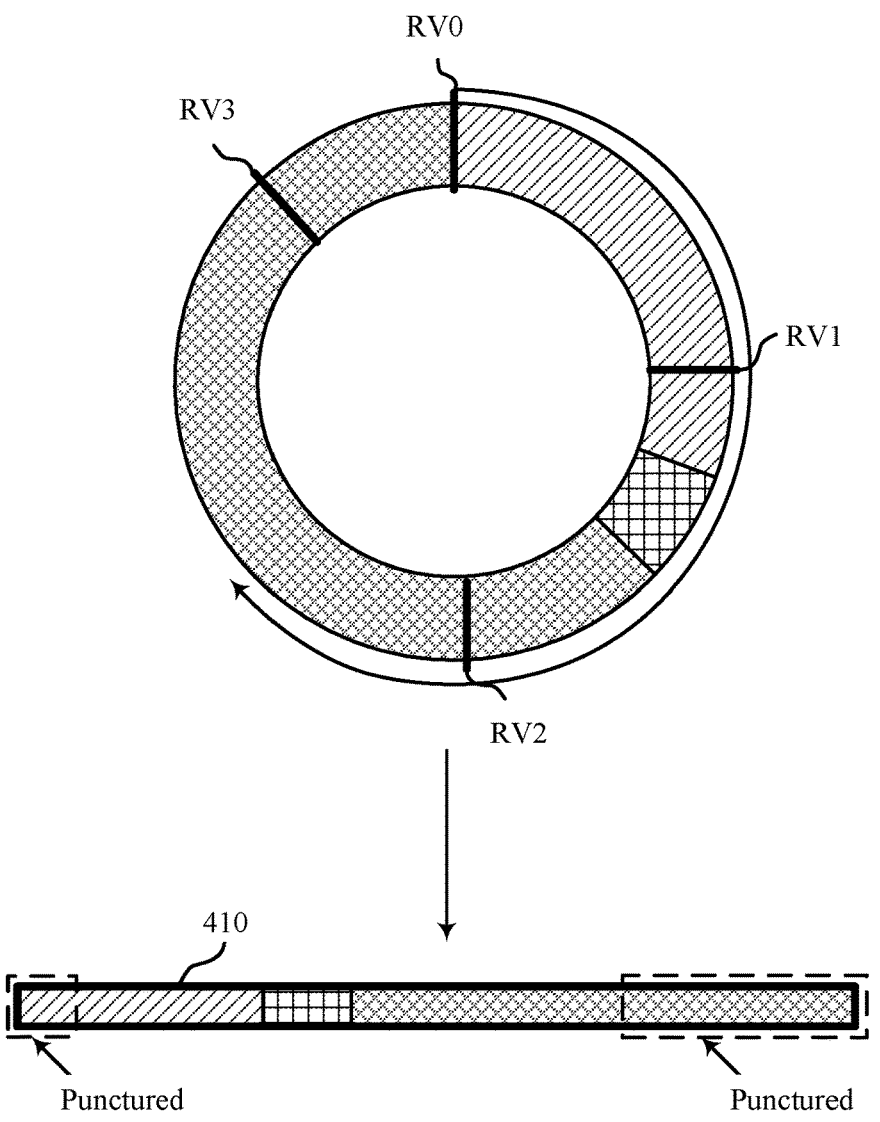
FIG. 4 illustrates an example of a circular buffer that supports redundancy version selection in sidelink in accordance with one or more aspects of the present disclosure.
Figure 4:
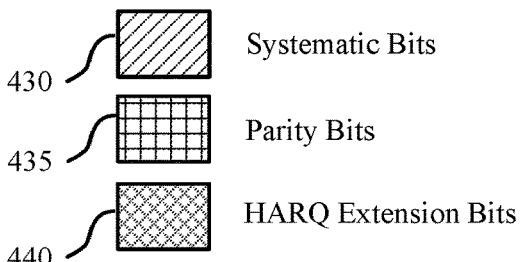

FIG. 4 illustrates an example of a circular buffer 400 that supports redundancy version selection in sidelink in accordance with one or more aspects of the present disclosure. In some examples, the circular buffer 400 may implement or be implemented by aspects of wireless communication systems 100 and 200 as described with reference to FIGS. 1 and 2. For example, the circular buffer 400 illustrates a conceptual circular buffer for performing rate-matched sidelink communications by a transmitting UE 115 and a receiving UE 115, which may represent examples of corresponding devices as described with reference to FIGS. 1-3. In the example of FIG. 4, the encoded bits in the circular buffer 400 may be written into a code block 410 by a receiving device, which may represent an example of a code block as described with reference to FIGS. 1-3.

As described with reference to FIGS. 1-3, a transmitting UE 115 may select a redundancy version to use for encoding a transmission from a set of redundancy versions based on one or more conditions. The set of redundancy versions may include self-decodable redundancy versions, which may be associated with relatively high code rates such that the receiving UE 115 may receive a sufficient quantity of systematic bits 430 to accurately decode a transmission.

FIG. 4 illustrates an example in which encoded LDPC bits in a conceptual circular buffer are downloaded to a code block 410 at a receiving UE 115 as a part of a read operation. That is, the receiving UE 115 may read and decode a set of bits from a transmission based on a length of the circular buffer and a code rate. The circular buffer and the code block 410 may contain coded bits, such as systematic bits 430, parity bits 435, and HARQ extension bits 440, which may represent examples of corresponding coded bits described with reference to FIGS. 1-3. In some examples, one or more of the coded bits may be punctured in some sections of the code block 410. The puncturing may occur based on data allocation (e.g., code rate). For example, a beginning portion of the systematic bits 430 may be punctured, as described with reference to FIGS. 1-3. Additionally, or alternatively, one or more other portions of the coded bits may be punctured based on which redundancy version is used for the transmission, as illustrated in FIG. 3.

In the context of a read operation, the redundancy version may correspond to a starting location on the circular buffer. For example, the RV0 may indicate a position or bit in the circular buffer that may be a starting point for reading from the circular buffer. Redundancy versions may allow for varying reliability for decoding the code block. For example, the RV0 may be associated with a relatively high self-decodability because of the location of the RV0 relative to the systematic bits 430. The starting point of the RV0 may provide for at least some of systematic bits 430, or all of the systematic bits 430 to be read and decoded by the receiving UE 115. The dashed lines illustrated in FIG. 4 represent example portions of the code block 410 that may be punctured (e.g., not transmitted or read) if the RV0 is used, and may correspond to the non-patterned bits in the code block 305 illustrated in FIG. 3. As such, the receiving UE 115 may have a relatively a high likelihood of accurately decoding a transmission based on the bits that are decoded when RV0 is used.

The RV1 and the RV2 illustrated in FIG. 4 may be associated with a lower self-decodability than the RV0 because of the location of the RV1 and the RV2 relative to the systematic bits 430. For example, the RV1 may be associated with a starting position approximately a quarter-length into the circular buffer. If the receiving UE 115 starts reading bits from the RV1, the receiving UE 115 may read a relatively small portion of the systematic bits 430 and some or all of the parity bits 435. Additionally, or alternatively, depending on the code rate, the receiving UE 115 may read some of the HARQ extension bits 440 (e.g., for higher code rates). The RV2 may be associated with a starting position that is approximately halfway into the length of the circular buffer. If the receiving UE 115 starts reading bits from the RV2, the receiving UE 115 may read and decode the HARQ extension bits 440, but the receiving UE 115 may not read and decode the systematic bits 430 and the parity bits 435. The HARQ extension bits 440 alone may not be sufficiently reliable for the receiving UE 115 to accurately decode the transmission. As such, the RV1 and the RV2 may be associated with relatively low reliability and self-decodability.

The RV3 illustrated in FIG. 4 may be associated with a relatively high self-decodability (e.g., higher than the RV1 and the RV2) because of the location of RV3 relative to the systematic bits 430. The RV3 may be associated with a starting position that is near the top of the circular buffer (e.g., seven eighths of the length of the circular buffer, or some other length). If the receiving UE 115 starts reading bits from the RV3, the receiving UE 115 may read and decode a portion of the HARQ extension bits 440 before reading and decoding at least some of the systematic bits 430. The combination of the HARQ extension bits 440 and the systematic bits 430 read by the receiving UE 115 may improve reliability of the decoding process, such that the RV3 may be associated with a relatively high code rate and individual transmission performance.

The redundancy versions illustrated in FIG. 4 are examples. It is to be understood that any other redundancy versions may be defined and used. For example, a redundancy version associated with a starting location between the RV3 and the RV0 on the circular buffer may be defined and used in scenarios in which self-decodability may be beneficial. Additionally, or alternatively, one or more redundancy versions may be combined and utilized. In some other aspects, one or more redundancy versions may be associated with an interleaved pattern of the systematic bits 430, the parity bits 435, and the HARQ extension bits 440. For example, a redundancy version (e.g., RV1') may be associated with a starting position similar to RV1 illustrated in FIG. 4. However, if such a redundancy version is used, a transmitting UE 115 may interleave the bits before writing to the circular buffer, such that the systematic bits 430 may be scrambled throughout the circular buffer and interleaved with the parity bits 435 and the HARQ extension bits 440.

Different redundancy versions may thereby be utilized for varying levels of self-decodability as well as IR gains. In some communication scenarios, a single transmission using a self-decodable redundancy version may be beneficial. In other communication scenarios, one or more IR retransmissions may improve reliability and throughput. Thus, the techniques for redundancy version selection for sidelink communications described herein may provide for improved communication reliability and throughput based on varying conditions of the sidelink communications.

As described with reference to FIGS. 1-3, a UE 115 may receiving information indicative of multiple sets of redundancy versions. Each set may be associated with a respective set of one or more conditions. The UE 115 may determine which set of redundancy versions to use based on satisfaction of the one or more conditions. Some sets may include self-decodable redundancy versions (e.g., the RV3 and the RV0 in FIG. 4). Some other sets may include redundancy versions associated with a relatively high combining gain (e.g., the RV0 and the RV2 in FIG. 4). If the conditions are satisfied for a given set, the UE 115 may select a redundancy version from the set and use the selected redundancy version to encode the transmission.

The conditions for use of a self-decodable set of redundancy versions may include an amount of feedback received, a transmission priority, a cast type, a level of system congestion, a resource pool configuration, one or more other conditions, or any combination thereof, as described with reference to FIG. 2. The described techniques may thus improve reliability and throughput of sidelink communications while reducing overhead and latency.

Figure 5:
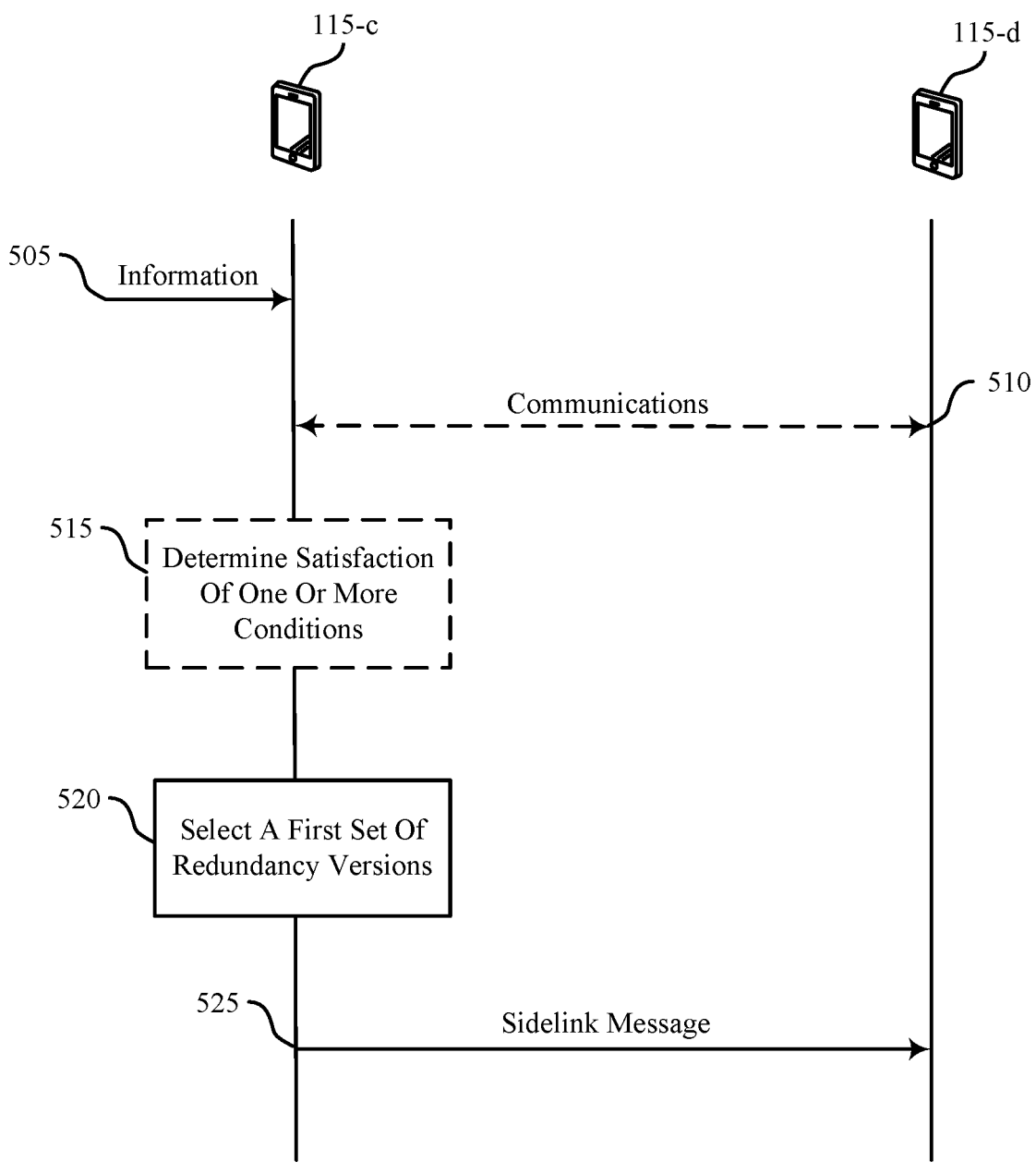
FIG. 5 illustrates an example of a process flow that supports redundancy version selection in sidelink in accordance with one or more aspects of the present disclosure.

FIG. 5 illustrates an example of a process flow 500 that supports redundancy version selection in sidelink in accordance with one or more aspects of the present disclosure. In some examples, the process flow 500 may implement aspects of the wireless communication system 100 and the wireless communication system 200 as described with reference to FIGS. 1 and 2. For example, the process flow 500 may include a UE 115-c and a UE 115-d. The UE 115-c and the UE 115-d may represent examples of a UE 115 as described with reference to FIGS. 1-4.

In the following description of the process flow 500, the operations between the UE 115-*c* and the UE 115-*d* may be performed in different orders or at different times. Some operations may also be left out of the process flow 500, or other operations may be added. Although the UE 115-*c* and the UE 115-*d* are shown performing the operations of the process flow 500, some aspects of some operations may also be performed by one or more other wireless devices.

At 505, the UE 115-*c* may receive information indicative of one or more sets of redundancy versions available for sidelink communications. Each set of the one or more sets of redundancy versions may be associated with one or more conditions for use of the respective set. In some examples, the information may be transmitted via control signaling, such as an RRC message, a medium access control-control element (MAC-CE), or some other control signaling from a network entity 105. In some examples, the UE 115-*c* may forward the information to the UE 115-*d*, or the UE 115-*d* may receive the information from the network entity 105.

At 510, in some examples, the UE 115-*d* and the UE 115-*c* may engage in sidelink communications. For example, the UE 115-*c* may transmit one or more sidelink messages to the UE 115-*d*. The UE 115-*d* may transmit one or more feedback messages (e.g., ACKs or NACKs) for the respective sidelink messages to the UE 115-*c*.

At 515, in some examples, the UE 115-*c* may determine satisfaction of one or more conditions associated with a first set of one or more redundancy versions. The UE 115-*c* may determine whether the one or more conditions are satisfied based on the communications at 510, based on one or more parameters associated with a scheduled sidelink transmission by the UE 115-*c*, or both. In some examples, the UE 115-*c* may compare a quantity of one or more NACKs received from the UE 115-*d* within a predefined duration of time, received consecutively from the UE 115-*d* (e.g., without an ACK), or both with a threshold quantity. The UE 115-*c* may determine the satisfaction of one or more conditions for use of the first set of redundancy versions based on the quantity of the one or more NACKs satisfying the threshold quantity. In another example, the UE 115-*c* may compare a ratio of a first quantity of the one or more NACKs and a second quantity of positive ACKs received from the UE 115-*d* with a threshold ratio. The UE 115-*c* may determine the satisfaction of one or more conditions for use of the first set of redundancy versions based on the ratio satisfying the threshold ratio.

In some examples, the 115-*c* may determine the satisfaction of the one or more conditions for use of the first set based on a quantity of the one or more first sidelink messages for which feedback is not received being greater than a threshold quantity. In another example, the UE 115-*c* may determine satisfaction of the one or more conditions for use of the first set based on feedback being disabled for a scheduled sidelink transmission. In some examples, the UE 115-*c* may determine whether a slot associated with the sidelink message includes PSFCH resources. The UE 115-*c* may determine satisfaction of the one or more conditions based on the slot including the one or more physical sidelink feedback channel resources.

In some examples, the UE 115-*c* may measure system congestion at the UE 115-*c* based on the communications with the UE 115-*d*, based on other communications, based on one or more congestion metrics, or any combination thereof. The UE 115-*c* may determine satisfaction of the one or more conditions based on a level of the measured system congestion satisfying a threshold level of system congestion.

In some examples, the UE 115-*c* may compare a code rate for a scheduled sidelink message with a threshold code rate, and the UE 115-*c* may determine the satisfaction of the one or more conditions based on the code rate exceeding the threshold code rate. In some examples, the UE 115-*c* may determine satisfaction of the one or more conditions based on a transmission priority associated with a scheduled sidelink message exceeding a threshold transmission priority. In some examples, the UE 115-*c* may determine satisfaction of the one or more conditions based on a cast type of the scheduled sidelink message being a broadcast or groupcast type.

In some examples, the UE 115-*c* may determine a resource pool allocated for the sidelink message. The UE 115-*c* may determine the satisfaction of the one or more conditions based on the resource pool (e.g., a resource pool-specific configuration). In some examples, a resource pool configuration may indicate which of the one or more conditions the UE 115-*c* may utilize.

At 520, the UE 115-*c* may select a first set of redundancy versions from the multiple sets of redundancy versions indicated via the information. The UE 115-*c* may select the first set based on satisfaction of one or more conditions associated with the first set. In some examples, the first set of redundancy versions may include one or more self-decodable redundancy versions. Each self-decodable redundancy version may be associated with a code rate that is greater than a threshold code rate.

At 525, the UE 115-*c* may transmit a sidelink message to the UE 115-*d* using a redundancy version included within the first set of redundancy versions. The UE 115-*c* may rate match the sidelink message based on the selected redundancy version.

Figure 6:
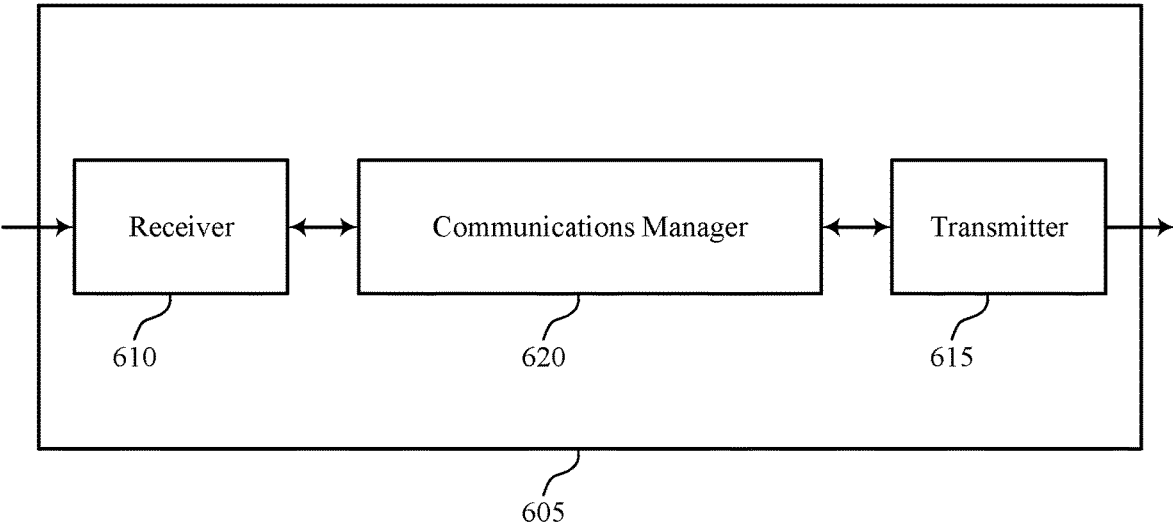
FIGS. 6 and 7 show block diagrams of devices that support redundancy version selection in sidelink in accordance with one or more aspects of the present disclosure.
Figure 6:

FIG. 6 shows a block diagram 600 of a device 605 that supports redundancy version selection in sidelink in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to redundancy version selection in sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to redundancy version selection in sidelink). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of redundancy version selection in sidelink as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving information indicative of a set of multiple sets of redundancy versions available for sidelink communications, each of the set of multiple sets associated with one or more conditions for use of a respective set. The communications manager 620 may be configured as or otherwise support a means for selecting a first set from the set of multiple sets of redundancy versions available for transmission of a sidelink message, selection of the first set based on satisfaction of the one or more conditions associated with the first set. The communications manager 620 may be configured as or otherwise support a means for transmitting the sidelink message using a redundancy version included within the first set of redundancy versions.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption and more efficient utilization of communication resources.

Figure 7:
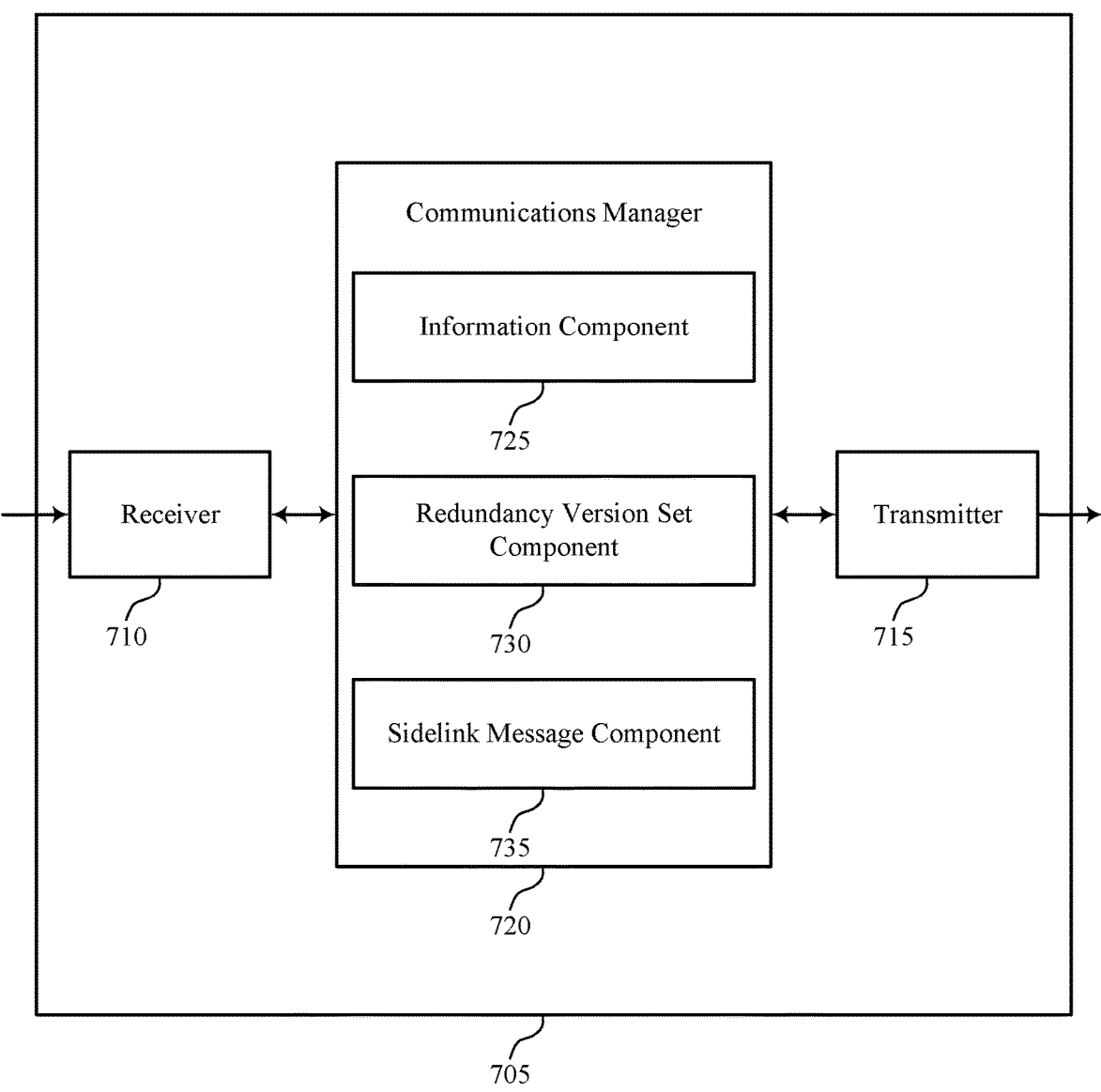

FIG. 7 shows a block diagram 700 of a device 705 that supports redundancy version selection in sidelink in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to redundancy version selection in sidelink). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to redundancy version selection in sidelink). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of redundancy version selection in sidelink as described herein. For example, the communications manager 720 may include an information component 725, a redundancy version set component 730, a sidelink message component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The information component 725 may be configured as or otherwise support a means for receiving information indicative of a set of multiple sets of redundancy versions available for sidelink communications, each of the set of multiple sets associated with one or more conditions for use of a respective set. The redundancy version set component 730 may be configured as or otherwise support a means for selecting a first set from the set of multiple sets of redundancy versions available for transmission of a sidelink message, selection of the first set based on satisfaction of the one or more conditions associated with the first set. The sidelink message component 735 may be configured as or otherwise support a means for transmitting the sidelink message using a redundancy version included within the first set of redundancy versions.

Figure 8:
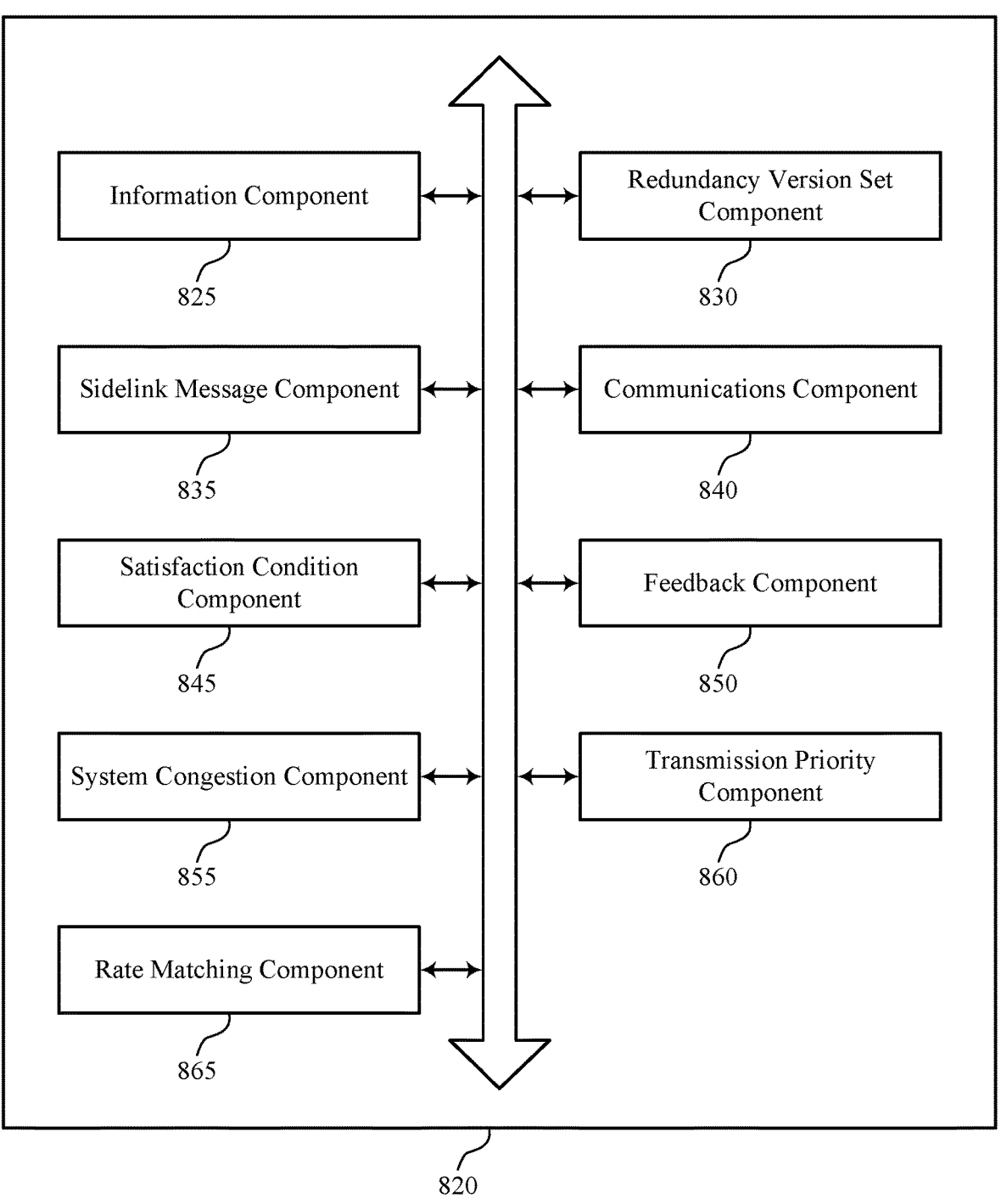
FIG. 8 shows a block diagram of a communications manager that supports redundancy version selection in sidelink in accordance with one or more aspects of the present disclosure.

FIG. 8 shows a block diagram 800 of a communications manager 820 that supports redundancy version selection in sidelink in accordance with one or more aspects of the present disclosure. The communications manager 820 may be an example of aspects of a communications manager 620, a communications manager 720, or both, as described herein. The communications manager 820, or various components thereof, may be an example of means for performing various aspects of redundancy version selection in sidelink as described herein. For example, the communications manager 820 may include an information component 825, a redundancy version set component 830, a sidelink message component 835, a communications component 840, a condition satisfaction component 845, a feedback component 850, a system congestion component 855, a transmission priority component 860, a rate matching component 865, or any combination thereof. Each of these components may communicate, directly or indirectly, with one another (e.g., via one or more buses).

The communications manager 820 may support wireless communications at a UE in accordance with examples as disclosed herein. The information component 825 may be configured as or otherwise support a means for receiving information indicative of a set of multiple sets of redundancy versions available for sidelink communications, each of the set of multiple sets associated with one or more conditions for use of a respective set. The redundancy version set component 830 may be configured as or otherwise support a means for selecting a first set from the set of multiple sets of redundancy versions available for transmission of a sidelink message, selection of the first set based on satisfaction of the one or more conditions associated with the first set. The sidelink message component 835 may be configured as or otherwise support a means for transmitting the sidelink message using a redundancy version included within the first set of redundancy versions.

In some examples, the communications component 840 may be configured as or otherwise support a means for receiving one or more NACKs. In some examples, the condition satisfaction component 845 may be configured as or otherwise support a means for comparing a quantity of the one or more NACKs received within a predefined duration of time with a threshold quantity, where satisfaction of the one or more conditions for use of the first set may be based on the quantity of one or more NACKs satisfying the threshold quantity. In some examples, the condition satisfaction component 845 may be configured as or otherwise support a means for comparing a quantity of the one or more NACKs that are consecutively received with a threshold ratio, where satisfaction of the one or more conditions for use of the first set is based on the quantity of the one or more NACKs satisfying the threshold quantity.

In some examples, the condition satisfaction component 845 may be configured as or otherwise support a means for comparing a ratio of a first quantity of the one or more NACKs and a second quantity of ACKs received by the UE with a threshold ratio, where satisfaction of the one or more conditions for use of the first set is based on the ratio satisfying the threshold ratio.

In some examples, the sidelink message component 835 may be configured as or otherwise support a means for transmitting one or more first sidelink messages. In some examples, the feedback component 850 may be configured as or otherwise support a means for monitoring for feedback in response to the one or more first sidelink messages, where the satisfaction of the one or more conditions for use of the first set is based on a quantity of the one or more first sidelink messages for which feedback is not received being greater than a threshold quantity.

In some examples, the system congestion component 855 may be configured as or otherwise support a means for measuring system congestion at the UE, where satisfaction of the one or more conditions is based on a level of the measured system congestion satisfying a threshold level of system congestion.

In some examples, the condition satisfaction component 845 may be configured as or otherwise support a means for determining whether feedback associated with the sidelink message is enabled or disabled, where the satisfaction of the one or more conditions associated with the first set is based on the feedback being disabled.

In some examples, the condition satisfaction component 845 may be configured as or otherwise support a means for determining whether a slot associated with the sidelink message contains one or more PSFCH resources, where the satisfaction of the one or more conditions associated with the first set is based on the slot containing the one or more PSFCH resources.

In some examples, the condition satisfaction component 845 may be configured as or otherwise support a means for comparing a code rate for the sidelink message with a threshold code rate, where the satisfaction of the one or more conditions for use of the first set is based on the code rate exceeding the threshold code rate.

In some examples, the transmission priority component 860 may be configured as or otherwise support a means for determining a transmission priority associated with the sidelink message, the one or more conditions based on the transmission priority.

In some examples, the condition satisfaction component 845 may be configured as or otherwise support a means for determining a cast type associated with the sidelink message is one of a broadcast type, a groupcast type, or a unicast type, where the satisfaction of the one or more conditions associated with the first set is based on the cast type being the broadcast type or the groupcast type.

In some examples, the condition satisfaction component 845 may be configured as or otherwise support a means for determining a resource pool allocated for the sidelink message, where the one or more conditions for use of the first set are based on the resource pool.

In some examples, the rate matching component 865 may be configured as or otherwise support a means for rate matching the sidelink message based on the redundancy version of the first set of redundancy versions. In some examples, the first set of redundancy versions may include one or more self-decodable redundancy versions each associated with a code rate that is greater than a threshold code rate.

Figure 9:
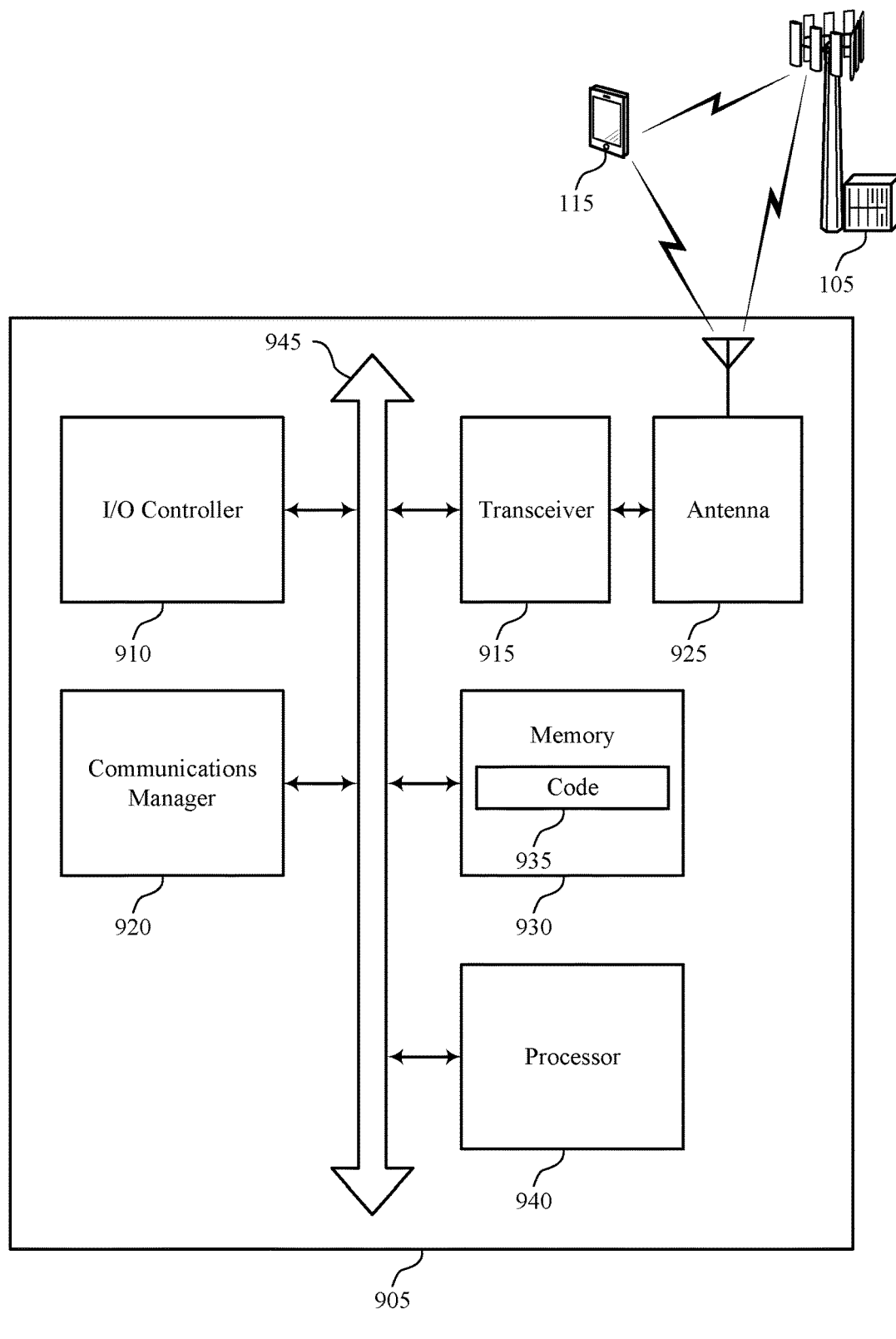
FIG. 9 shows a diagram of a system including a device that supports redundancy version selection in sidelink in accordance with one or more aspects of the present disclosure.

FIG. 9 shows a diagram of a system 900 including a device 905 that supports redundancy version selection in sidelink in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting redundancy version selection in sidelink). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving information indicative of a set of multiple sets of redundancy versions available for sidelink communications, each of the set of multiple sets associated with one or more conditions for use of a respective set. The communications manager 920 may be configured as or otherwise support a means for selecting a first set from the set of multiple sets of redundancy versions available for transmission of a sidelink message, selection of the first set based on satisfaction of the one or more conditions associated with the first set. The communications manager 920 may be configured as or otherwise support a means for transmitting the sidelink message using a redundancy version included within the first set of redundancy versions.

By including or configuring the communications manager 920 in accordance with examples as described herein, the device 905 may support techniques for improved communication reliability, reduced latency, reduced power consumption, more efficient utilization of communication resources, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of redundancy version selection in sidelink as described herein, or the processor 940 and the memory 930 may be otherwise configured to perform or support such operations.

FIG. 10 shows a flowchart illustrating a method 1000 that supports redundancy version selection in sidelink in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving information indicative of a set of multiple sets of redundancy versions available for sidelink communications, each of the set of multiple sets associated with one or more conditions for use of a respective set. The operations of 1005 may be performed in accordance with examples as disclosed herein. In some examples, aspects of the operations of 1005 may be performed by an information component 825 as described with reference to FIG. 8.

At 1010, the method may include selecting a first set from the set of multiple sets of redundancy versions available for transmission of a sidelink message, selection of the first set based on satisfaction of the one or more conditions associated with the first set. The operations of 1010 may be performed in accordance with examples as disclosed herein. In some examples, aspects of the operations of 1010 may be performed by a redundancy version set component 830 as described with reference to FIG. 8.

At 1015, the method may include transmitting the sidelink message using a redundancy version included within the first set of redundancy versions. The operations of 1015 may be performed in accordance with examples as disclosed herein. In some examples, aspects of the operations of 1015 may be performed by a sidelink message component 835 as described with reference to FIG. 8.

FIG. 11 shows a flowchart illustrating a method 1100 that supports redundancy version selection in sidelink in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving information indicative of a set of multiple sets of redundancy versions available for sidelink communications, each of the set of multiple sets associated with one or more conditions for use of a respective set. The operations of 1105 may be performed in accordance with examples as disclosed herein. In some examples, aspects of the operations of 1105 may be performed by an information component 825 as described with reference to FIG. 8.

At 1110, the method may include receiving one or more NACKs. The operations of 1110 may be performed in accordance with examples as disclosed herein. In some examples, aspects of the operations of 1110 may be performed by a communications component 840 as described with reference to FIG. 8.

At 1115, the method may include comparing a quantity of the one or more NACKS with one or more threshold quantities. In some examples, the quantity of one or more NACKs received within a predefined duration of time may be compared with a threshold quantity. Additionally, or alternatively, the quantity of the one or more NACKs consecutively received may be compared with a threshold quantity. In some other examples, a ratio of a first quantity of the one or more NACKs and a second quantity of positive ACKs received by the UE may be compared with a threshold ratio. The operations of 1115 may be performed in accordance with examples as disclosed herein. In some examples, aspects of the operations of 1115 may be performed by a condition satisfaction component 845 as described with reference to FIG. 8.

At 1120, the method may include selecting a first set from the set of multiple sets of redundancy versions available for transmission of a sidelink message, selection of the first set based on satisfaction of the one or more conditions associated with the first set. In some examples, satisfaction of the one or more conditions for use of the first set may be based on the quantity of the one or more NACKs satisfying at least one of the one or more threshold quantities. The operations of 1120 may be performed in accordance with examples as disclosed herein. In some examples, aspects of the operations of 1120 may be performed by a redundancy version set component 830 as described with reference to FIG. 8.

At 1125, the method may include transmitting the sidelink message using a redundancy version included within the first set of redundancy versions. The operations of 1125 may be performed in accordance with examples as disclosed herein. In some examples, aspects of the operations of 1125 may be performed by a sidelink message component 835 as described with reference to FIG. 8.

The following provides an overview of aspects of the present disclosure:

Aspect 1: A method for wireless communications at a UE, comprising: receiving information indicative of a plurality of sets of redundancy versions available for sidelink communications, each of the plurality of sets associated with one or more conditions for use of a respective set; selecting a first set from the plurality of sets of redundancy versions available for transmission of a sidelink message, selection of the first set based at least in part on satisfaction of the one or more conditions associated with the first set; and transmitting the sidelink message using a redundancy version included within the first set of redundancy versions.

Aspect 2: The method of aspect 1, further comprising: receiving one or more NACKs; and comparing a quantity of the one or more NACKs received within a predefined duration of time with a threshold quantity, wherein the satisfaction of the one or more conditions for use of the first set is based at least in part on the quantity of the one or more NACKs satisfying the threshold quantity.

Aspect 3: The method of any of aspects 1 through 2, further comprising: receiving one or more NACKs; and comparing a quantity of the one or more NACKs that are consecutively received with a threshold quantity, wherein the satisfaction of the one or more conditions for use of the first set is based at least in part on the quantity of the one or more NACKs satisfying the threshold quantity.

Aspect 4: The method of any of aspects 1 through 3, further comprising: receiving one or more NACKs; and comparing a ratio of a first quantity of the one or more NACKs and a second quantity of ACKs received by the UE with a threshold ratio, wherein the satisfaction of the one or more conditions for use of the first set is based at least in part on the ratio satisfying the threshold ratio.

Aspect 5: The method of any of aspects 1 through 4, further comprising: transmitting one or more first sidelink messages; and monitoring for feedback in response to the one or more first sidelink messages, wherein the satisfaction of the one or more conditions for use of the first set is based at least in part on a quantity of the one or more first sidelink messages for which feedback is not received being greater than a threshold quantity.

Aspect 6: The method of any of aspects 1 through 5, further comprising: measuring system congestion at the UE, wherein the satisfaction of the one or more conditions is based at least in part on a level of the measured system congestion satisfying a threshold level of system congestion.

Aspect 7: The method of any of aspects 1 through 6, further comprising: determining whether feedback associated with the sidelink message is enabled or disabled, wherein the satisfaction of the one or more conditions associated with the first set is based at least in part on the feedback being disabled.

Aspect 8: The method of any of aspects 1 through 7, further comprising: determining whether a slot associated with the sidelink message contains one or more PSFCH resources, wherein the satisfaction of the one or more conditions associated with the first set is based at least in part on the slot containing the one or more PSFCH resources.

Aspect 9: The method of any of aspects 1 through 8, further comprising: comparing a code rate for the sidelink message with a threshold code rate, wherein the satisfaction of the one or more conditions for use of the first set is based at least in part on the code rate exceeding the threshold code rate.

Aspect 10: The method of any of aspects 1 through 9, further comprising: determining a transmission priority associated with the sidelink message, wherein the satisfaction of the one or more conditions is based at least in part on the transmission priority exceeding a threshold transmission priority.

Aspect 11: The method of any of aspects 1 through 10, further comprising: determining a cast type associated with the sidelink message is one of a broadcast type, a groupcast type, or a unicast type, wherein the satisfaction of the one or more conditions associated with the first set is based at least in part on the cast type being the broadcast type or the groupcast type.

Aspect 12: The method of any of aspects 1 through 11, further comprising: determining a resource pool allocated for the sidelink message, wherein the one or more conditions for use of the first set are based at least in part on the resource pool.

Aspect 13: The method of any of aspects 1 through 12, further comprising: receiving a control message that indicates the one or more conditions for use of the respective set.

Aspect 14: The method of any of aspects 1 through 13, further comprising: rate matching the sidelink message based at least in part on the redundancy version of the first set of redundancy versions.

Aspect 15: The method of any of aspects 1 through 14, wherein the first set of redundancy versions comprises one or more self-decodable redundancy versions, each self-decodable redundancy version associated with a code rate that is greater than a threshold code rate.

Aspect 16: An apparatus for wireless communications at a UE, comprising a processor; memory coupled with the processor; and instructions stored in the memory and executable by the processor to cause the apparatus to perform a method of any of aspects 1 through 15.

Aspect 17: An apparatus for wireless communications at a UE, comprising at least one means for performing a method of any of aspects 1 through 15.

Aspect 18: A non-transitory computer-readable medium storing code for wireless communications at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
  one or more memories storing processor-executable code; and
  one or more processors coupled with the one or more memories and individually or collectively operable to execute the code to cause the UE to:
    receive control signaling that includes information indicative of:
      a plurality of sets of redundancy versions available for sidelink communications; and
      a plurality of sidelink conditions for use of each set of the plurality of sets, the plurality of sidelink conditions comprising conditions associated with sidelink feedback at the UE, sidelink communications by the UE, sidelink resources, or any combination thereof, wherein:
        each set of the plurality of sets comprises one or more redundancy versions; and each set of the plurality of sets is associated with one or more sidelink conditions, of the plurality of sidelink conditions, for use of a respective set;
    select a first set from the plurality of sets of redundancy versions available for transmission of a sidelink message, selection of the first set based at least in part on satisfaction of the one or more sidelink conditions associated with the first set during sidelink communications between the UE and a second UE; and
    transmit the sidelink message using a redundancy version included within the first set of redundancy versions.

2. The UE of claim 1, wherein the one or more processors are individually or collectively further operable to execute the code to cause the UE to:
  receive one or more negative acknowledgments; and
  compare a quantity of the one or more negative acknowledgments received within a predefined duration of time with a threshold quantity, wherein the satisfaction of the one or more sidelink conditions for use of the first set is based at least in part on the quantity of the one or more negative acknowledgments satisfying the threshold quantity.

3. The UE of claim 1, wherein the one or more processors are individually or collectively further operable to execute the code to cause the UE to:
  receive one or more negative acknowledgments; and
  compare a quantity of the one or more negative acknowledgments that are consecutively received with a threshold quantity, wherein the satisfaction of the one or more sidelink conditions for use of the first set is based at least in part on the quantity of the one or more negative acknowledgments satisfying the threshold quantity.

4. The UE of claim 1, wherein the one or more processors are individually or collectively further operable to execute the code to cause the UE to:
  receive one or more negative acknowledgments; and
  compare a ratio of a first quantity of the one or more negative acknowledgments and a second quantity of positive acknowledgments received by the UE with a threshold ratio, wherein the satisfaction of the one or more sidelink conditions for use of the first set is based at least in part on the ratio satisfying the threshold ratio.

5. The UE of claim 1, wherein the one or more processors are individually or collectively further operable to execute the code to cause the UE to:
  transmit one or more first sidelink messages; and
  monitor for feedback in response to the one or more first sidelink messages, wherein the satisfaction of the one or more sidelink conditions for use of the first set is based at least in part on a quantity of the one or more first sidelink messages for which feedback is not received being greater than a threshold quantity.

6. The UE of claim 1, wherein the one or more processors are individually or collectively further operable to execute the code to cause the UE to:
  measure system congestion at the UE, wherein the satisfaction of the one or more sidelink conditions is based at least in part on a level of the measured system congestion satisfying a threshold level of system congestion.

7. The UE of claim 1, wherein the one or more processors are individually or collectively further operable to execute the code to cause the UE to:

determine whether feedback associated with the sidelink message is enabled or disabled, wherein the satisfaction of the one or more sidelink conditions associated with the first set is based at least in part on the feedback being disabled.

8. The UE of claim 1, wherein the one or more processors are individually or collectively further operable to execute the code to cause the UE to:

determine whether a slot associated with the sidelink message contains one or more physical sidelink feedback channel resources, wherein the satisfaction of the one or more sidelink conditions associated with the first set is based at least in part on the slot containing the one or more physical sidelink feedback channel resources.

9. The UE of claim 1, wherein the one or more processors are individually or collectively further operable to execute the code to cause the UE to:

compare a code rate for the sidelink message with a threshold code rate, wherein the satisfaction of the one or more sidelink conditions for use of the first set is based at least in part on the code rate exceeding the threshold code rate.

10. The UE of claim 1, wherein the one or more processors are individually or collectively further operable to execute the code to cause the UE to:

determine a transmission priority associated with the sidelink message, wherein the satisfaction of the one or more sidelink conditions is based at least in part on the transmission priority exceeding a threshold transmission priority.

11. The UE of claim 1, wherein the one or more processors are individually or collectively further operable to execute the code to cause the UE to:

determine a cast type associated with the sidelink message is one of a broadcast type, a groupcast type, or a unicast type, wherein the satisfaction of the one or more sidelink conditions associated with the first set is based at least in part on the cast type being the broadcast type or the groupcast type.

12. The UE of claim 1, wherein the one or more processors are individually or collectively further operable to execute the code to cause the UE to:

determine a resource pool allocated for the sidelink message, wherein the one or more sidelink conditions for use of the first set are based at least in part on the resource pool.

13. The UE of claim 1, wherein the one or more processors are individually or collectively further operable to execute the code to cause the UE to:

receiving a control message that indicates the one or more sidelink conditions for use of the respective set.

14. The UE of claim 1, wherein the one or more processors are individually or collectively further operable to execute the code to cause the UE to:

rate matching the sidelink message based at least in part on the redundancy version of the first set of redundancy versions.

15. The UE of claim 1, wherein the first set of redundancy versions comprises one or more self-decodable redundancy versions, each self-decodable redundancy version associated with a code rate that is greater than a threshold code rate.

16. A method for wireless communications at a user equipment (UE), comprising:

receiving control signaling that includes information indicative of:

a plurality of sets of redundancy versions available for sidelink communications; and a plurality of sidelink conditions for use of each set of the plurality of sets, the plurality of sidelink conditions comprising conditions associated with sidelink feedback at the UE, sidelink communications by the UE, sidelink resources, or any combination thereof, wherein:

each set of the plurality of sets comprises one or more redundancy versions; and each set of the plurality of sets is associated with one or more sidelink conditions, of the plurality of sidelink conditions, for use of a respective set;

selecting a first set from the plurality of sets of redundancy versions available for transmission of a sidelink message, selection of the first set based at least in part on satisfaction of the one or more sidelink conditions associated with the first set during sidelink communications between the UE and a second UE; and transmitting the sidelink message using a redundancy version included within the first set of redundancy versions.

17. The method of claim 16, further comprising:

receiving one or more negative acknowledgments; and comparing a quantity of the one or more negative acknowledgments received within a predefined duration of time with a threshold quantity, wherein the satisfaction of the one or more sidelink conditions for use of the first set is based at least in part on the quantity of the one or more negative acknowledgments satisfying the threshold quantity.

18. The method of claim 16, further comprising:

receiving one or more negative acknowledgments; and comparing a quantity of the one or more negative acknowledgments that are consecutively received with a threshold quantity, wherein the satisfaction of the one or more sidelink conditions for use of the first set is based at least in part on the quantity of the one or more negative acknowledgments satisfying the threshold quantity.

19. The method of claim 16, further comprising:

receiving one or more negative acknowledgments; and comparing a ratio of a first quantity of the one or more negative acknowledgments and a second quantity of positive acknowledgments received by the UE with a threshold ratio, wherein the satisfaction of the one or more sidelink conditions for use of the first set is based at least in part on the ratio satisfying the threshold ratio.

20. An apparatus for wireless communications at a user equipment (UE), comprising:

means for receiving control signaling that includes information indicative of:

a plurality of sets of redundancy versions available for sidelink communications; and a plurality of sidelink conditions for use of each set of the plurality of sets, the plurality of sidelink conditions comprising conditions associated with sidelink feedback at the UE, sidelink communications by the UE, sidelink resources, or any combination thereof, wherein:

each set of the plurality of sets comprises one or more redundancy versions; and each set of the plurality of sets is associated with one or more sidelink conditions, of the plurality of sidelink conditions, for use of a respective set;

means for selecting a first set from the plurality of sets of redundancy versions available for transmission of a sidelink message, selection of the first set based at least in part on satisfaction of the one or more sidelink conditions associated with the first set during sidelink communications between the UE and a second UE; and means for transmitting the sidelink message using a redundancy version included within the first set of redundancy versions.

\* \* \* \* \*